(12) United States Patent
Furusato et al.

(10) Patent No.: US 6,661,019 B2
(45) Date of Patent: Dec. 9, 2003

(54) ACTIVE MATRIX CIRCUIT, METHOD OF DRIVING THE SAME, AND SURFACE PRESSURE DISTRIBUTION DETECTING APPARATUS

(75) Inventors: Takao Furusato, Kanagawa (JP); Hiroaki Ichikawa, Kanagawa (JP)

(73) Assignee: Sony Corporation (JP)

( * ) Notice: Subject to any disclaimer, the term of this patent is extended or adjusted under 35 U.S.C. 154(b) by 246 days.

(21) Appl. No.: 09/840,275

(22) Filed: Apr. 24, 2001

(65) Prior Publication Data

US 2001/0033254 A1 Oct. 25, 2001

(30) Foreign Application Priority Data

Apr. 25, 2000 (JP) .................................. P2000-123830
Jul. 11, 2000 (JP) .................................. P2000-210070

(51) Int. Cl.$^7$ ............................. H01L 29/84; G06K 4/20
(52) U.S. Cl. .................. 250/556; 73/862.046; 382/124
(58) Field of Search ................. 250/556, 555, 250/214 R, 214 LS, 559.4, 559.44; 356/71; 73/862.046; 382/124

(56) References Cited

U.S. PATENT DOCUMENTS 5,400,662 A * 3/1995 Tamori .................. 73/862.046
5,978,496 A * 11/1999 Harkin ...................... 382/124

* cited by examiner

*Primary Examiner*—Scott J. Sugarman
*Assistant Examiner*—Richard Hanig
(74) *Attorney, Agent, or Firm*—Rader, Fishman & Grauer PLLC; Ronald P. Kananen

(57) ABSTRACT

An active matrix circuit having a simplified circuit configuration is disclosed. The active matrix circuit includes selection lines extending along rows, signal lines extending along columns, active devices disposed at respective locations where the selection lines and the signal lines cross each other, a vertical scanning circuit for outputting selection pulses to sequentially scan the selection lines thereby selecting active devices, and a horizontal scanning circuit for outputting control pulses to open or close the respective signal lines thereby inputting or outputting a signal to selected active devices. The vertical scanning circuit includes a transfer circuit for transferring an input start pulse from a first stage to a final stage in a stage-by-stage fashion in response to a clock signal thereby generating a selection pulse, and also includes a start pulse generating circuit which internally generates a start pulse by processing a selection pulse output from the final stage of the transfer circuit and applies the resultant start pulse to the first stage of the transfer circuit. The clock signal may be internally generated. The start pulse supplied to the horizontal scanning circuit may be internally generated.

51 Claims, 32 Drawing Sheets

* NOTE: $\overline{CLK}$, WHICH IS AN INVERTED SIGNAL OF CLK, IS NOT SHOWN HEREIN

ACTIVE MATRIX CIRCUIT, METHOD OF DRIVING THE SAME, AND SURFACE PRESSURE DISTRIBUTION DETECTING APPARATUS

BACKGROUND OF THE INVENTION

1. Field of the Invention

The present invention relates to an active matrix circuit, a method of driving an active matrix circuit, and a surface pressure distribution detecting apparatus.

2. Description of the Related Art

An active matrix circuit basically includes selection lines extending along rows, signal lines extending along columns, active devices disposed at respective locations where the selection lines and the signal lines cross each other, a vertical scanning circuit for outputting selection pulses to sequentially scan the selection lines thereby selecting active devices, and a horizontal scanning circuit for outputting control pulses to open or close the respective signal lines thereby inputting or outputting a signal to selected active devices. The active matrix circuit having above structure may be used, for example, in a liquid crystal display, a surface pressure distribution detecting apparatus, etc. When the active matrix circuit is used in a display device such as a liquid crystal display, the horizontal scanning circuit outputs an image signal to pixel electrodes connected to corresponding active devices. When the active matrix circuit is used in a surface pressure distribution detecting apparatus such as a fingerprint detector, the horizontal scanning circuit inputs a pressure signal applied to electrodes connected to corresponding active devices.

The horizontal scanning circuit described above includes a transfer circuit including a shift register which transfers a horizontal start pulse from a first stage to a final stage in a stage-by-stage fashion in response to a horizontal clock signal thereby outputting control pulses. The vertical scanning circuit includes a vertical transfer circuit which transfers, in response to a vertical clock signal, a vertical start pulse from a first stage to a final stage in a stage-by-stage fashion. Conventionally, the start pulses and the clock signals are supplied to the transfer circuits from an external timing generator. However, use of an external timing generator results in complexity of the overall structure of a system using an active matrix circuit. Furthermore, the horizontal or vertical scanning circuit according to the conventional technique includes a voltage multiplying circuit for internally stepping up a low-voltage start pulse or clock pulse input from the outside and supplying resultant high-voltage pulses to the transfer circuit. However, in this voltage multiplying circuit, the clock signals supplied to the respective stages of the transfer circuit are stepped up using a single level shifter, and thus a very large load is imposed upon the level shifter. As a result, a large signal delay occurs and large power is consumed.

SUMMARY OF THE INVENTION

The above-described problems in the conventional technique can be solved according to aspects of the present invention as described below. According to a first aspect of the present invention, there is provided an active matrix circuit comprising selection lines extending along rows, signal lines extending along columns, active devices disposed at respective locations where the selection lines and the signal lines cross each other, a vertical scanning circuit for outputting selection pulses to sequentially scan the selection lines thereby selecting active devices, and a horizontal scanning circuit for outputting control pulses to open or close the respective signal lines thereby inputting or outputting a signal to selected active devices, the active matrix circuit being characterized in that: the vertical scanning circuit includes a transfer circuit for transferring an input start pulse from a first stage to a final stage in a stage-by-stage fashion in response to a clock signal thereby generating a selection pulse, and also includes a start pulse generating circuit which internally generates a start pulse by processing a selection pulse output from the final stage of the transfer circuit and applies the resultant start pulse to the first stage of the transfer circuit.

According to a second aspect of the present invention, there is provided an active matrix circuit comprising selection lines extending along rows, signal lines extending along columns, active devices disposed at respective locations where the selection lines and the signal lines cross each other, a vertical scanning circuit for outputting selection pulses to sequentially scan the selection lines thereby selecting active devices, and a horizontal scanning circuit for outputting control pulses to open or close the respective signal lines thereby inputting or outputting a signal to selected active devices, the active matrix circuit being characterized in that: the horizontal scanning circuit includes a horizontal transfer circuit for transferring a horizontal start pulse from a first stage to a final stage in a stage-by-stage fashion in response to a horizontal clock signal thereby outputting a control pulse; and the vertical scanning circuit includes a vertical transfer circuit for transferring a vertical start pulse from a first stage to a final stage in a stage-by-stage fashion in response to a vertical clock signal and also includes a vertical clock signal generator which generates a vertical clock signal by processing a control pulse output from the final stage of the horizontal transfer circuit and supplies the resultant vertical clock signal to the vertical transfer circuit.

According to a third aspect of the present invention, there is provided an active matrix circuit comprising selection lines extending along rows, signal lines extending along columns, active devices disposed at respective locations where the selection lines and the signal lines cross each other, a vertical scanning circuit for outputting selection pulses to sequentially scan the selection lines thereby selecting active devices, and a horizontal scanning circuit for outputting control pulses to open or close the respective signal lines thereby inputting or outputting a signal to selected active devices, the active matrix circuit being characterized in that: the horizontal scanning circuit includes a transfer circuit for transferring an input start pulse from a first stage to a final stage in a stage-by-stage fashion in response to a clock signal thereby generating a control pulse, and also includes a start pulse generating circuit which internally generates a start pulse by processing a control pulse output from the final stage of the transfer circuit and applies the resultant start pulse to the first stage of the transfer circuit.

According to a fourth aspect of the present invention, there is provided an active matrix circuit comprising selection lines extending along rows, signal lines extending along columns, active devices disposed at respective locations where the selection lines and the signal lines cross each other, a vertical scanning circuit for outputting selection pulses to sequentially scan the selection lines thereby selecting active devices, and a horizontal scanning circuit for outputting control pulses to open or close the respective signal lines thereby inputting or outputting a signal to selected active devices, the active matrix circuit being characterized in that: the horizontal scanning circuit includes a horizontal transfer circuit for transferring a horizontal start pulse from a first stage to a final stage in a stage-by-stage fashion in response to a horizontal clock signal thereby outputting a control pulse; the vertical scanning circuit includes a vertical transfer circuit for transferring a vertical start pulse from a first stage to a final stage in a stage-by-stage fashion in response to a vertical clock signal; and the active matrix circuit further comprises a reset circuit for, in response to a reset pulse supplied from the outside, forcedly resetting the horizontal transfer circuit and the vertical transfer circuit into their initial states.

According to a fifth aspect of the present invention, there is provided an active matrix circuit comprising selection lines extending along rows, signal lines extending along columns, active devices disposed at respective locations where the selection lines and the signal lines cross each other, a vertical scanning circuit for outputting selection pulses to sequentially scan the selection lines thereby selecting active devices, and a horizontal scanning circuit for outputting control pulses to open or close the respective signal lines thereby inputting or outputting a signal to selected active devices, the horizontal scanning circuit including a first horizontal transfer circuit for transferring a first start pulse from a first stage to a final stage in a stage-by-stage fashion in response to a first clock signal thereby outputting a control pulse, the vertical scanning circuit including a second horizontal transfer circuit for transferring a second start pulse from a first stage to a final stage in a stage-by-stage fashion in response to a second clock signal, the active matrix circuit being characterized in that: the active matrix circuit further comprises a voltage multiplying circuit for stepping up a low-voltage clock signal input from the outside and supplying a resultant high-voltage clock signal to respective stages of the transfer circuits, the voltage multiplying circuit including a plurality of level shifters for individually stepping up clock signals for the respective stages of the transfer circuit. Preferably, each level shifter performs a stepping-up operation in synchronization with the transferring operation of a corresponding stage of the transfer circuits. The on-off transition of the voltage multiplying operation of each level shifter is directly controlled by a pulse output from a corresponding stage of the transfer circuits.

According to a sixth aspect of the present invention, there is provided an active matrix circuit comprising selection lines extending along rows, signal lines extending along columns, active devices disposed at respective locations where the selection lines and the signal lines cross each other, a vertical scanning circuit for outputting selection pulses to sequentially scan the selection lines thereby selecting active devices, and a horizontal scanning circuit for outputting control pulses to open or close the respective signal lines thereby inputting or outputting a signal to selected active devices, the horizontal scanning circuit including a first horizontal transfer circuit for transferring a first start pulse from a first stage to a final stage in a stage-by-stage fashion in response to a first clock signal thereby outputting a control pulse, the vertical scanning circuit including a second horizontal transfer circuit for transferring a second start pulse from a first stage to a final stage in a stage-by-stage fashion in response to a second clock signal, the active matrix circuit being characterized in that: the active matrix circuit further comprises a voltage multiplying circuit for stepping up a low-voltage clock signal input from the outside and supplying a resultant high-voltage clock signal to respective stages of the transfer circuits, and the voltage multiplying circuit includes level shifters for individually stepping up a clock signal for respective sets of two or more stages of the transfer circuits. Preferably, each level shifter performs a stepping-up operation in synchronization with the transferring operation of a corresponding set of two or more stages of the transfer circuits.

According to a seventh aspect of the present invention, there is provided an active matrix circuit comprising selection lines extending along rows, signal lines extending along columns, active devices disposed at respective locations where the selection lines and the signal lines cross each other, a vertical scanning circuit for outputting selection pulses to sequentially scan the selection lines thereby selecting active devices, and a horizontal scanning circuit for outputting control pulses to open or close the respective signal lines thereby inputting or outputting a signal to selected active devices, the horizontal scanning circuit including a transfer circuit for transferring a start pulse from a first stage to a final stage in a stage-by-stage fashion in response to a clock signal thereby outputting a control pulse, the active matrix circuit being characterized in that: the active matrix circuit further comprises a voltage multiplying circuit for stepping up a low-voltage clock signal input from the outside and supplying a resultant high-voltage clock signal to respective stages of the transfer circuit, the voltage multiplying circuit includes a plurality of level shifters for separately stepping up clock signals for the respective stages of the transfer circuit, each stage of the transfer circuit performs a transferring operation in response to a clock signal supplied from a corresponding level shifter thereby outputting a control pulse, and the active matrix circuit further comprises a switch for sampling the clock signal in response to the control pulse and controlling the on/off operation associated with the respective signal lines.

In the active matrix circuit according to the first aspect of the present invention, after the transfer operation is started, the vertical start pulse is internally generated so that the transfer operation can be performed starting from the first-stage vertical line (first row). The next start pulse is generated by processing a selection pulse output from the final stage of the vertical transfer circuit and the generated start pulse is supplied to the first stage of the vertical transfer circuit. The operation performed via such a loop in the circuit minimizes the necessity of external inputs and allows a reduction in power consumption of the circuit. In the active matrix circuit according to the second aspect of the present invention, the first-stage vertical line is operated in response to starting of the transfer operation. Thereafter, in the operation of the second and following stages, the vertical clock signal is internally generated by processing the control pulse output from the horizontal transfer circuit so that the start pulse is transferred from one stage to the next stage in response to the internally generated vertical clock signal. Because the vertical clock signal is internally generated, the necessity of the external inputs is reduced and a reduction in the power consumption of the circuit is achieved. In the active matrix circuit according to the third aspect of the present invention, after the operation is started in response to a horizontal pulse applied to the horizontal transfer circuit, following horizontal clock signals are internally generated one by one thereby maintaining the transfer operation. Because the transfer operation is performed via the looped path in the circuit, the necessity of the external inputs is reduced and a reduction in the power consumption of the circuit is achieved. In the active matrix circuit according to the fourth aspect of the present invention, the voltages in the transfer circuits are reset by a reset pulse input from the outside. This makes it possible to forcedly initialize the transfer state at any desired point of time. That is, resetting the voltages in the transfer circuit into initial values regardless of the current values allows a data transfer operation to be started at any desired point of time. This allows a reduction in the data processing time. In the active matrix circuit according to the fifth aspect of the present invention, the voltage multiplying circuit steps up the low-voltage clock signal input from the outside and supplies a resultant high-voltage clock signal to the respective stages of the shift register of the transfer circuit, wherein the voltage multiplying circuit includes level shifters provided for the respective stages of the transfer circuit so that each level shifter individually steps up a clock signal for a corresponding stage. Because each level shifter performs the stepping-up operation only when a corresponding stage of the transfer circuit performs the transfer operation, a reduction in the power consumption is achieved. This configuration, in which one level shifter is provided for one stage of a shift register of a transfer circuit, is useful in particular when it is applied to a first stage or a final stage. In the active matrix circuit according to the sixth aspect of the present invention, the voltage multiplying circuit includes level shifters for individually stepping up a clock signal for respective sets of two or more stages of the transfer circuits. This technique allows a reduction in the number of level shifters compared with a case in which one level shifter is provided for each stage of the shift register of the transfer circuit, and thus the voltage multiplying circuit can be realized in a simpler fashion. This technique is useful in particular when it is applied to middle stages of the transfer circuit. In the active matrix circuit according to the seventh aspect of the present invention, the voltage multiplying circuit includes a plurality of level shifters for individually stepping up clock signals for the respective stages of the horizontal transfer circuit, and each stage of the horizontal transfer circuit performs a transferring operation in response to a clock signal supplied from a corresponding level shifter thereby outputting a control pulse. Furthermore, in this seventh aspect of the present invention, the active matrix circuit further comprises a switch for sampling the clock signal in response to the control pulse and controlling the on/off operation associated with the respective signal lines. The stepped-up clock signal is directly used to open and close the switch, and thus a reduction in the total signal propagation delay in the circuit can be achieved.

DESCRIPTION OF THE PREFERRED EMBODIMENTS

Figure 1:
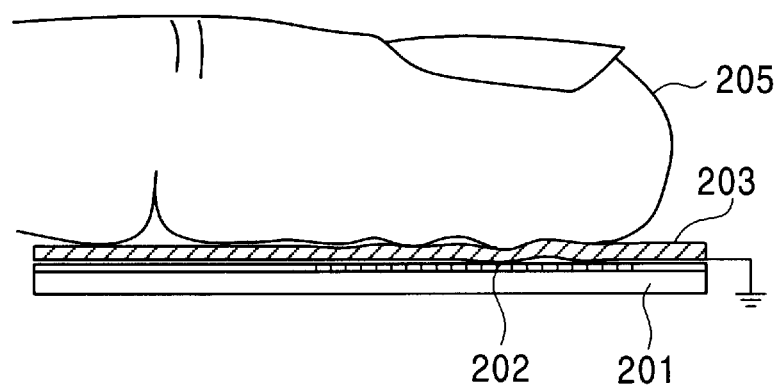
FIG. 1 is a schematic diagram illustrating an active matrix circuit used as a surface pressure distribution detecting apparatus according to the present invention.

The present invention is described in further detail below with reference to preferred embodiments in conjunction with the drawings. FIG. 1 is a schematic diagram illustrating a surface pressure distribution detecting apparatus using an active matrix circuit according to an embodiment of the present invention. This surface pressure distribution detecting apparatus is used as a fingerprint sensor and includes a substrate 201 formed of glass or the like, a sensing part 202 formed on the substrate 201 using a thin-film semiconductor process, and a flexible film 203 formed thereon. The film 203 is formed of polyester or polyamide with a thickness of about 10 μm, and an electrically conductive film is formed by means of evaporation or the like on the lower surface of the film 203. This electrically conductive film is grounded. The sensor part 202 includes electrodes arranged in the form of a matrix and thin film transistors (TFTS) connected to the respective electrodes. When a finger 205 whose fingerprint is to be detected is placed on the film 203 and the film 203 is lightly pressed by the finger 205, the film 203 is pressed down by ridges of the fingerprint. As a result, in areas in which the ridges are in contact with the film 203, the conductive film formed under the film 203 is brought into contact with the sensor electrodes of thin film transistors in the sensor part 202, and those electrodes are grounded via the conductive film 203. Thus, signal voltages applied from the outside are detected via the electrodes arranged in the form of the matrix and via the corresponding thin-film transistors, and a fingerprint is detected. Note that the active matrix circuit according to the present invention may be applied not only to surface pressure distribution detecting apparatuses such as a fingerprint sensor but also to other devices such as an active matrix liquid crystal display.

Figure 2:
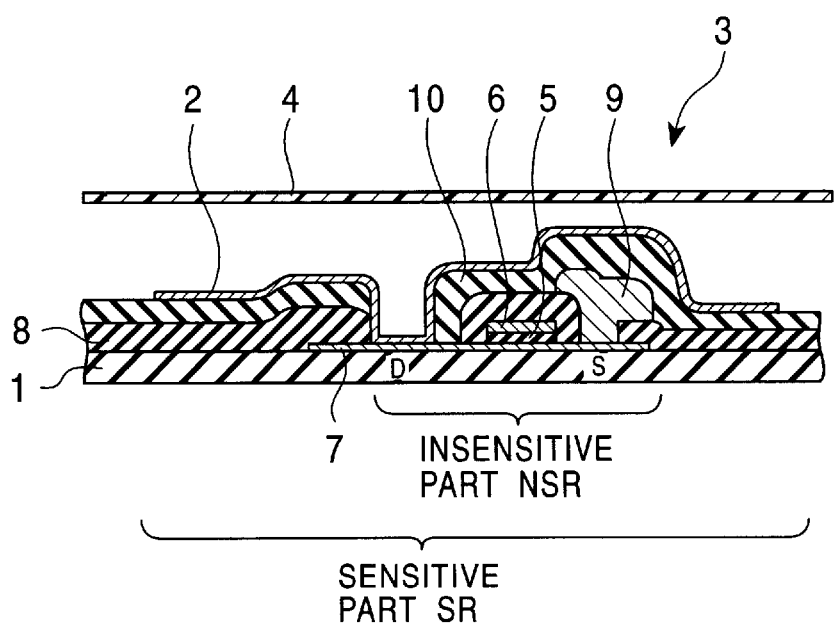
FIG. 2 is a cross-sectional view illustrating a specific configuration of the active matrix circuit shown in FIG. 1.

FIG. 2 is a partial cross-sectional view illustrating a specific example of a structure of the sensor part 202 shown in FIG. 1. As shown in FIG. 2, the active matrix circuit is formed using an insulating substrate 1 made of glass or the like. Device regions, each of which includes an electrode 2 and a thin film transistor 3 connected to each other, are integrally arranged in the form of a matrix on the insulating substrate 1. In FIG. 2, for the purpose of an easy understanding, only one device region is shown. In the case where the active matrix circuit including the thin film transistors having the above-described structure is used in a surface pressure distribution detecting apparatus, an isotropic conductive film 4 is disposed on the insulating substrate 1. The electrode 2 in each device region is sensitive to a signal voltage applied thereto from above via the conductive film 4. The thin film transistors 3 are sequentially turned on and off to detect signal voltages applied to the corresponding electrodes. A sensitive part SR including the electrodes 2 extends over insensitive parts NSR including the thin film transistors 3, the signal lines 9, and the gate lines such that the insensitive parts NSR are covered with the sensitive part SR. In each device region, the surface of the sensitive region SR is at the top of that device region. In other words, the thin film transistor 3, the signal line 9, and the gate line included in each insensitive part NSR is entirely covered with the corresponding electrode 2. This structure prevents adverse effects of a parasitic electric field produced in a vertical direction from the signal line 9 and the gate line when a signal voltage applied via the conductive film 4 is detected. That is, when seen from the side of the conductive film 4, there are substantially only the electrodes 2 on the surface of the insulating substrate 1, and thus high sensitivity can be achieved.

The structure of the apparatus is described in further detail below with reference to FIG. 2. The thin film transistor 3 has a top-gate structure in which the gate electrode 6 is disposed at the top, the thin semiconductor film 7 at the bottom, and the gate insulating film 5 in the middle. More specifically, the thin semiconductor film 7 formed of polysilicon or the like and patterned into the shape of an island is disposed on the insulating substrate 1 formed of quartz glass or the like. The gate electrode 6 formed of patterned $SiO_2$ or the like is disposed on the semiconductor thin-film 7 via the gate insulating film 5. Although not shown in FIG. 2, the gate line extends from the gate electrode 6. A source region S and a drain region D are formed in the thin semiconductor film 7, at respective sides of the gate electrode 6. The gate electrode 6 and the thin semiconductor film 7 are covered with a first interlayer insulating film 8 formed of phosphosilicate glass or the like. On the first interlayer insulating film 8, the signal line 9 formed by patterning a metal film such as aluminum is disposed. The signal line 9 is electrically connected to the source region S of the thin film transistor 3 via a contact hole. The signal line 9 is covered with a second interlayer insulating film 10 formed of phosphosilicate glass or the like. On the second interlayer insulating film 10, the electrode 2 formed by means of patterning is disposed. The electrode 2 is electrically connected to the drain region D of the thin film transistor 3 via a contact hole formed through the second interlayer insulating film 10 and the first interlayer insulating film 8. As can be seen from FIG. 2, the electrode 2 is formed such that the thin film transistor 3, the signal line 9, and the gate line included in the insensitive part NSR are shielded from the conductive film 4 by the electrode 2. This electrode 2 is formed by patterning a transparent conductive film such as an ITO film. When the thin film semiconductor device is employed in the surface pressure distribution detecting apparatus, the thin film semiconductor device is not necessarily needed to be transparent, and thus the electrode 2 is not necessarily needed to be formed of a transparent conductive film such as an ITO film. ITO is excellent as an electrode material in that it has high chemical stability and high mechanical strength, and thus ITO is used in the present embodiment. Note that the present invention is not limited to ITO, but other materials such as aluminum may also be employed to form the electrode 2.

Referring also to FIG. 2, a method of producing the thin film semiconductor device is briefly described below. First, non-crystalline silicon is formed by means of CVD or the like on the heat resistant insulating substrate 1 formed of quartz glass or the like. Thereafter, the non-crystalline silicon is converted into polycrystalline silicon by means of solid growth at a temperature higher than 1000° C. The thin semiconductor film 7 converted into a high quality form is then patterned into the shape of an island. Thereafter, the gate insulating film 5 is formed on the thin semiconductor film 7. More specifically, the thin semiconductor film 7 is subjected to a heat treatment at a temperature higher than 1000° C. to form a thermal oxide film serving as the gate insulating film 5. The gate electrode 6 is then formed of low-resistance polycrystalline silicon on the gate insulating film 5. Thereafter, impurity ions are doped into the thin semiconductor film 7 to a high concentration by means of ion implantation or the like using the gate electrode 6 as a mask thereby forming the drain region D and the source region S. The first interlayer insulating film 8 is then formed of PSG or the like by means of CVD or the like. A contact hole is then formed through the first interlayer insulating film 8, and metal such as aluminum is deposited on the first interlayer insulating film 8 by mean of sputtering. The aluminum is the patterned into a desired shape so as to form the signal line 9. Through the above process, the signal line 9 is electrically connected to the source region S of the thin film transistor 3 via the contact hole. The second interlayer insulating film 10 of PSG or the like is then deposited so that the signal line 9 is covered with the interlayer insulating film 10. A contact hole is then formed through the second interlayer insulating film 10 and the first interlayer insulating film 8, and ITO is deposited by means of sputtering or the like on the second interlayer insulating film 10. The ITO is then patterned into a desired shape so as to form the electrode 2. As a result of the above process, the electrode 2 is electrically connected to the drain region D of the thin film transistor 3 via the contact hole formed in the second interlayer insulating film 10 and the first interlayer insulating film 8. When the gate electrode 6 is formed by means of patterning, the gate line is also patterned.

Figure 3:
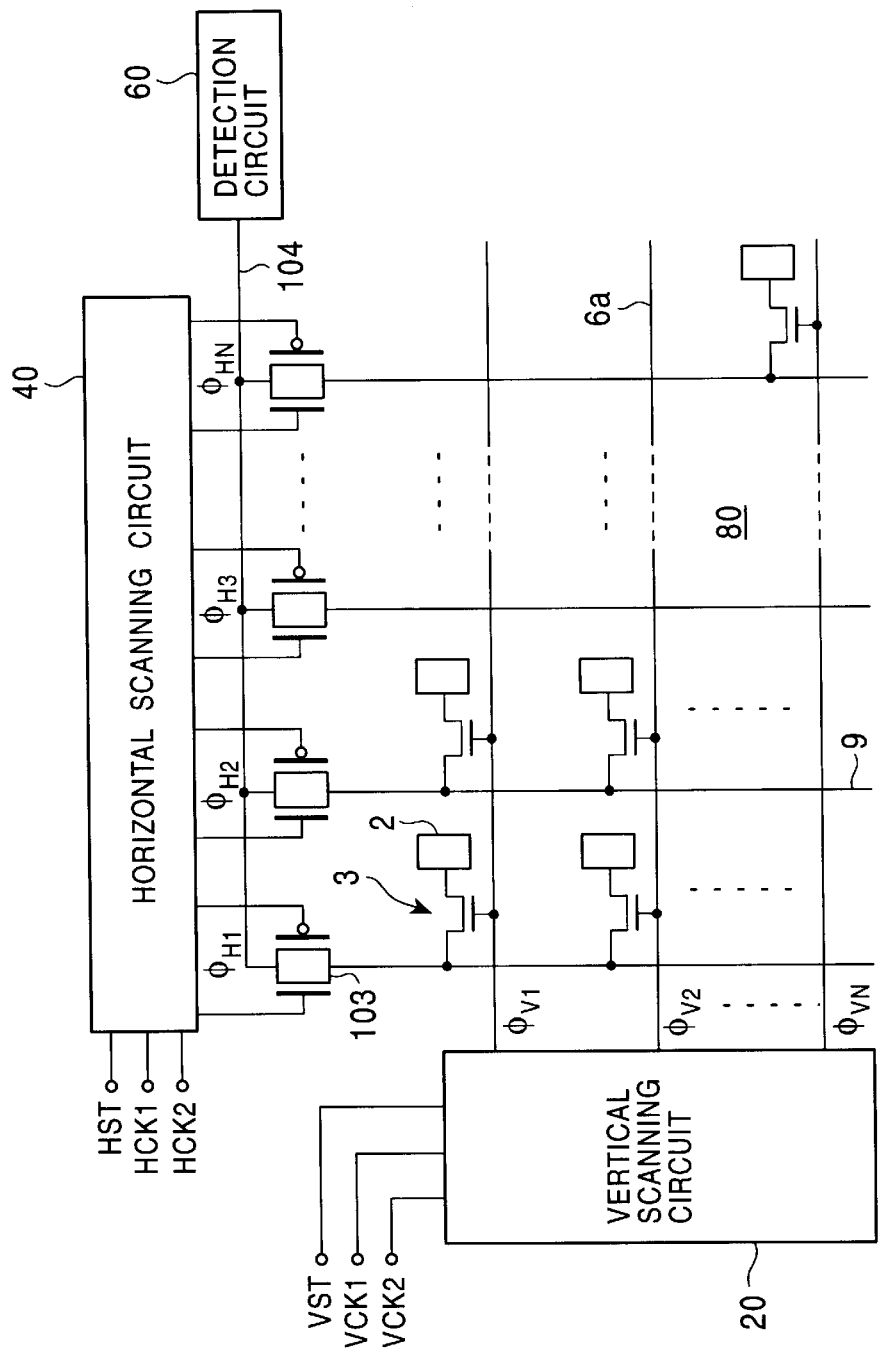
FIG. 3 is a circuit diagram illustrating the overall configuration of the active matrix circuit shown in FIG. 1.

FIG. 3 is a block diagram illustrating a total circuit configuration of the active matrix circuit shown in FIGS. 1 and 2. As shown in FIG. 3, the active matrix circuit includes a plurality of gate lines (selection lines) 6$a$ extending along rows and a plurality of signal lines 9 extending along columns. Electrodes 2 and thin film transistors 3 are disposed in respective locations where the gate lines 6$a$ and the signal lines 9 cross each other. The source region of each thin film transistor 3 is connected to a corresponding signal line 9 and the drain region of each thin film transistor 3 is connected to a corresponding electrode 2. The gate electrode of each thin film transistor 3 is connected to a corresponding gate line 6$a$. Although not shown in FIG. 3, the surfaces of the electrodes 2 disposed in the form of a matrix are covered with an anisotropic conductive film. The gate lines 6$a$ are connected to a vertical scanning circuit 20 formed of TFTs. The vertical scanning circuit 20 vertically scans the respective gate lines 6$a$ by outputting selection pulses $\phi_{V1}$, $\phi_{V2}, \ldots, \phi_{VM}$ so as to turn on the thin film transistors 3 such that thin film transistors 3 in one line are turned on in one horizontal period and thin film transistors 3 in a next one line are turned on in a next one horizontal period thereby selecting electrodes 2 line by line. The signal lines 9 are connected to a horizontal scanning circuit 40 formed of TFTs. In each horizontal period, the horizontal scanning circuit 40 sequentially scans the respective signal lines 9 thereby sequentially turning on the transistors 3 and reading signal voltages from the respective electrodes 2 via the corresponding turned-on transistors 3. Herein, the signal voltages are applied to the respective electrodes 2 via the conductive film. More specifically, the signal lines 9 are connected to a signal detecting line 104 via switches 103 so that the sensed signal voltages are sequentially supplied to an external detection circuit 60. The detection circuit 60 detects a fingerprint pattern by analyzing the received signal voltages. The horizontal scanning circuit 40 sequentially outputs sampling pulses $\phi_{H1}$, $\phi_{H2}$, $\phi_{H3}, \ldots, \phi_{HN}$ to sequentially turn on and off the respective switches 103 thereby sampling the signal voltages via the corresponding signal lines 9. As described above, the electrodes 2 are arranged in the form of the matrix in the sensor area 80. The vertical scanning circuit 20 and the horizontal scanning circuit 40 are disposed in an area outside the sensor area 80. The vertical scanning circuit 20 includes a vertical transfer circuit (shift register) for transferring a vertical start pulse VST from one stage to a following stage starting from a first stage toward a final stage in response to vertical clock signals VCK1 and VCK2. The horizontal scanning circuit 40 includes a horizontal transfer circuit (shift register) for transferring a horizontal start pulse HST from one stage to a following stage starting from a first stage toward a final stage in response to vertical clock signals HCK1 and HCK2 thereby outputting control pulses according to which sampling pulses are to be generated. VCK1 and VCK2 are opposite in phase to each other, and HCK1 and HCK2 are opposite in phase to each other.

Figure 4:
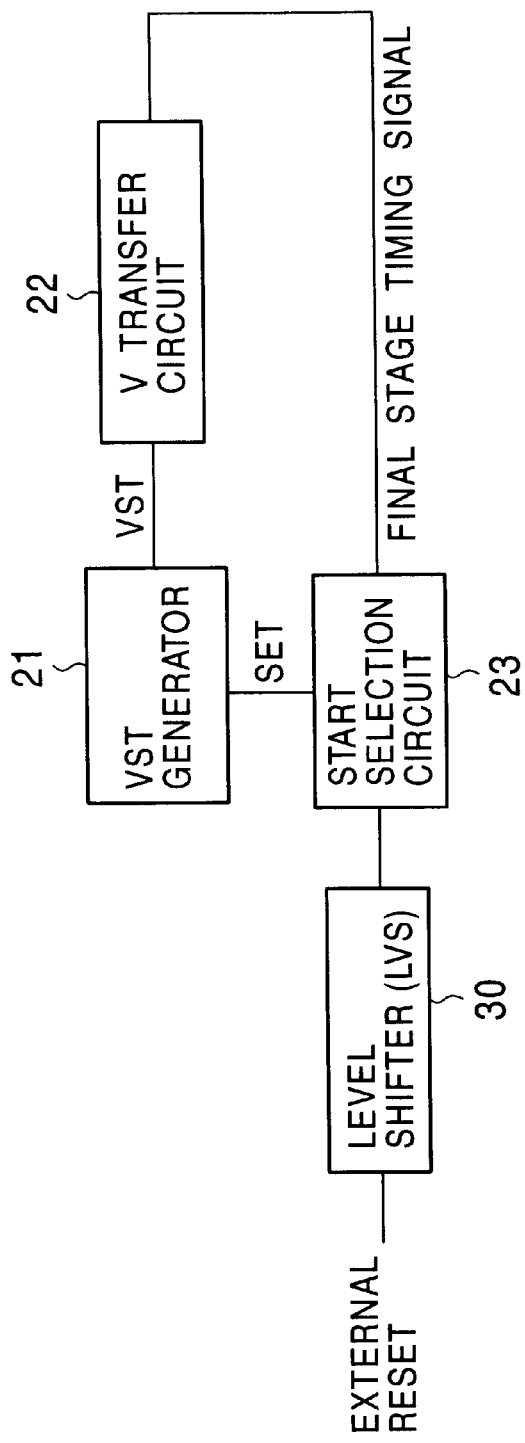
FIG. 4 is a block diagram illustrating a first embodiment of the present invention.

FIG. 4 is a block diagram illustrating an embodiment of an active matrix circuit according to the first aspect of the present invention, wherein, of various circuits in the active matrix circuit, a vertical scanning circuit and associated circuits are shown in FIG. 4. As shown in FIG. 4, the vertical scanning circuit of the active matrix circuit includes a vertical transfer circuit 22 for sequentially transferring an input vertical start pulse VST from one stage to a following stage starting from a first stage toward a final stage in response to a clock signal thereby generating a selection pulse, and a VST generator 21 which internally generates a start pulse by processing a selection pulse received from the final stage of the vertical transfer circuit 22 and outputs the resultant start pulse to the first stage of the vertical transfer circuit 22. The vertical scanning circuit further includes a level shifter 30 for stepping up the voltage of a reset signal input from the outside and also includes a start selection circuit 23. In the first transferring operation, the start selection circuit 23 selects the reset signal input from the outside and supplies it to the VST generator 21. However, in the following operation in which transferring is performed repeatedly, the start selection circuit 23 selects a timing signal (selection pulse) output from the final stage of the vertical transfer circuit 22 and supplies it to the VST generator 21.

Figure 5:
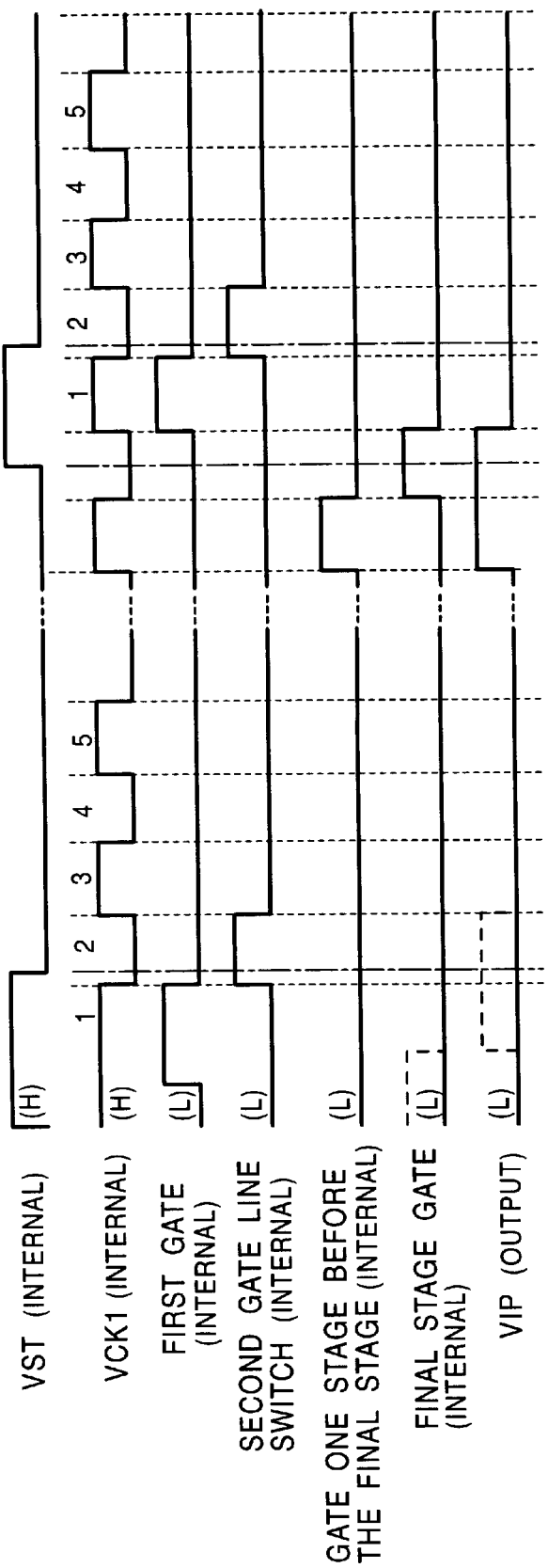
FIG. 5 is a waveform diagram associated with the operation according to the first embodiment of the present invention.

FIG. 5 is a timing chart illustrating the operation of the circuit shown in FIG. 4. As shown in FIG. 5, if a first vertical start pulse VST is applied to the vertical transfer circuit 22 via the start selection circuit 23, the vertical start pulse VST is transferred from one stage to a following stage in response to VCK1 thereby generating selection pulses. In the timing chart, a selection pulse output from the first stage is denoted by FIRST GATE, and a selection pulse output from the second stage is denoted by SECOND GATE. If the transfer circuit 22 outputs a selection pulse from the final stage as denoted by FINAL STAGE GATE in FIG. 5, this selection pulse is supplied to the VST generator 21 via the start selection circuit 23. In response to a selection pulse from the final stage, the VST generator 21 generates a next vertical start signal VST. As described above, after the first vertical start signal VST is supplied, following vertical start signals VST are internally generated one by one so as to maintain the transfer operation. As described above, vertical start signals VST are internally generated by the loop circuit after receiving the first setting signal (reset signal) and thus the transfer operation can be performed without needing to receive the vertical transfer start signals from the outside. This allows the transfer operation to be started at any desired time. Besides, an internal circuit or a system circuit for generating the transfer signal is not needed, and thus the circuit becomes simple and a reduction in the total power consumed by the system is achieved. When a vertical start signal VST has been transferred to the final stage, a next vertical start signal VST becomes ready to be generated, and thus transferring operation can be performed without needing an external signal. Because the vertical start signal VST is internally generated in the circuit, no significantly large propagation delay occurs, which would otherwise occur when the signal were passed through a voltage multiplication circuit or the like.

Figure 6:
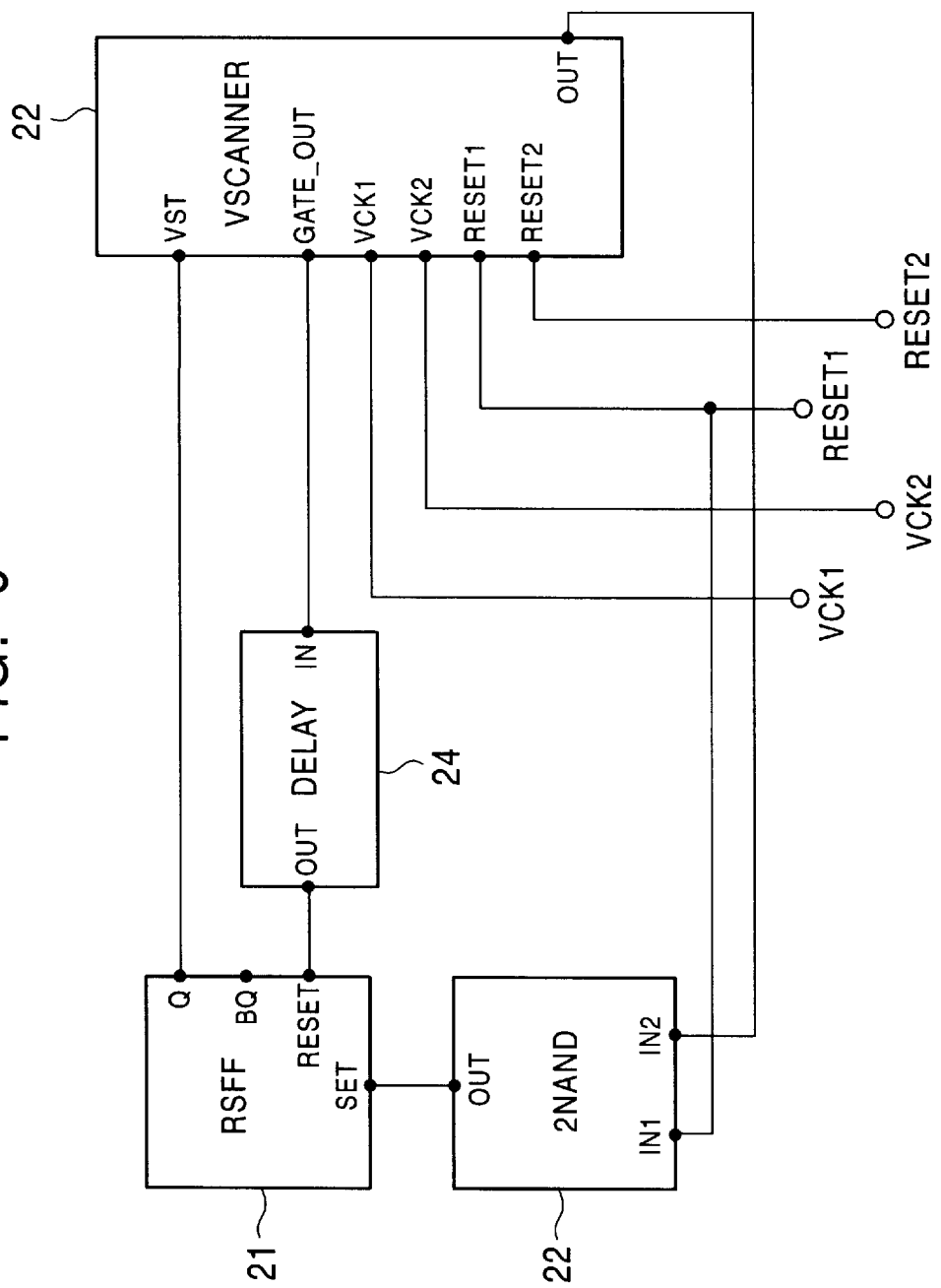
FIG. 6 is a diagram illustrating a specific circuit according to the first embodiment of the present invention.

FIG. 6 is a circuit diagram illustrating an example of a specific configuration of the circuit shown in FIG. 4. In this example, the VST generator 21 is formed of an RS flip flop (RSFF) and the start selection 23 is formed of a 2-NAND gate. A delay circuit 24 is disposed between the RSFF 21 and the vertical transfer circuit 22. In this specific example, the RSFF serving as the VST generator 21 starts to generate a vertical start signal VST when a signal output from the final stage of the vertical transfer circuit 22 is latched, and the RSFF 21 terminates the vertical start signal VST when the transfer operation of the first stage has been completed. The setting and resetting of the RSFF are controlled so as to output the vertical transfer signal VST to the first stage in the above-described manner, wherein the set signal is controlled via the NAND gate. The VST generator 21 may also be formed of a D flip flop (DFF) instead of the RSFF shown in FIG. 6. In this case, the signal output from the final stage is directly latched and output to the first stage.

Figure 7:
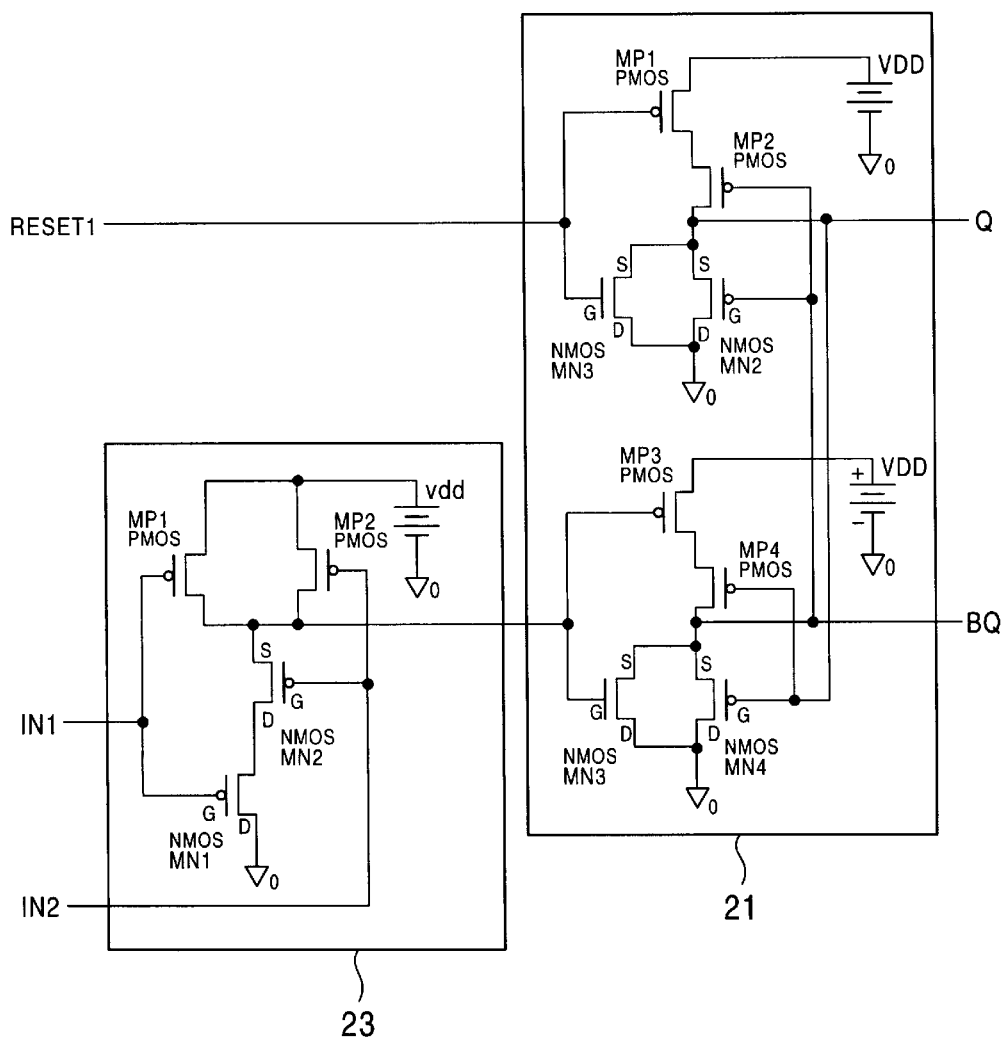
FIG. 7 is a diagram illustrating a further specific example of the configuration of the circuit shown in FIG. 6.

FIG. 7 is a circuit diagram illustrating a specific example of the configuration of the RSFF 21 and the 2-NAND gate 23 shown in FIG. 6. In this example, both the RSFF 21 and the 2-NAND gate 23 are formed of thin film transistors (TFTS) in the CMOS configuration.

Figure 8:
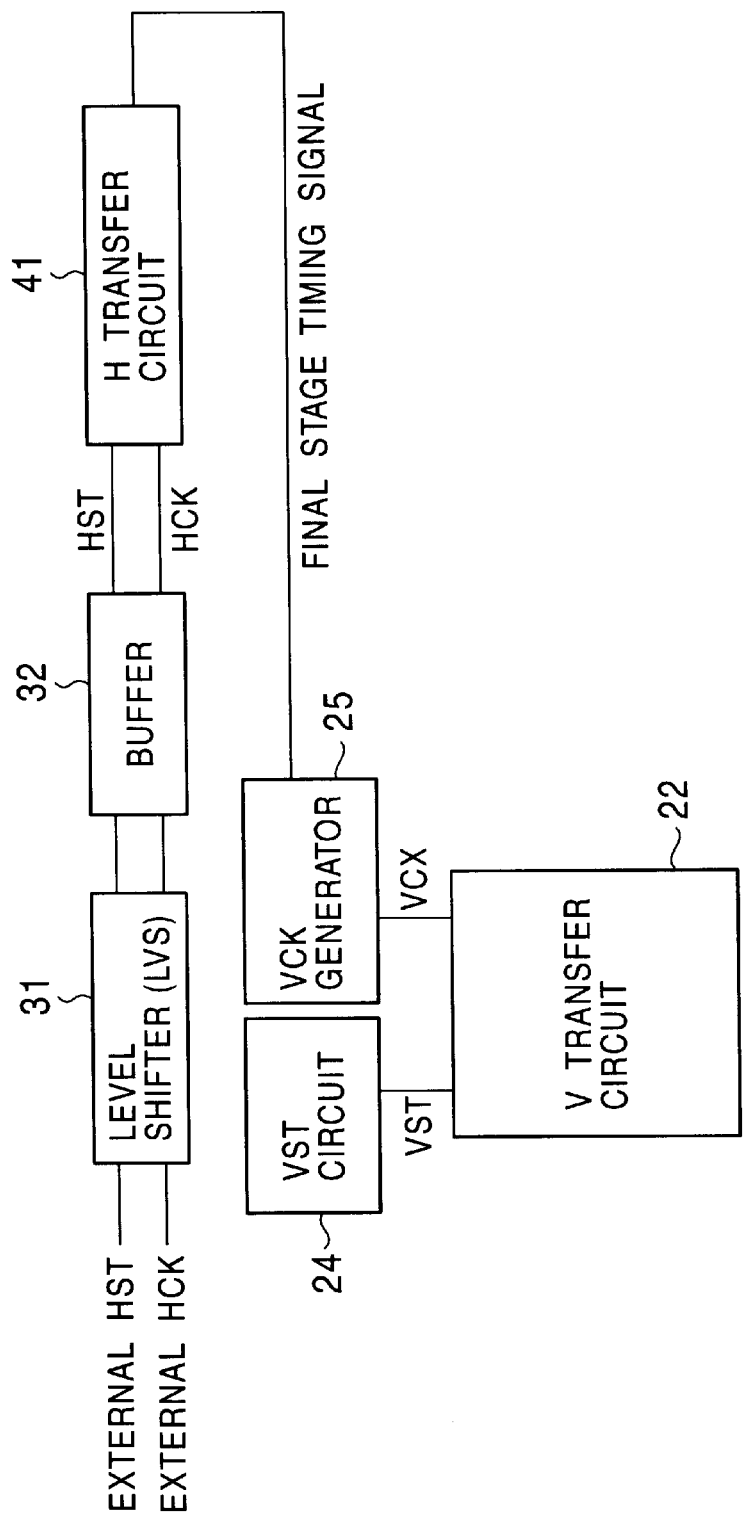
FIG. 8 is a block diagram illustrating a second embodiment of the present invention.

FIG. 8 illustrates an embodiment of an active matrix circuit according to the second aspect of the present invention. As shown in FIG. 8, the horizontal scanning circuit includes a horizontal transfer circuit 41 for transferring a horizontal start pulse HST, given from the outside, from one stage to a following stage starting from a first stage toward a final stage in response to a horizontal clock signal thereby generating a control pulse. In this example, HST and HCK input from the outside are supplied to the horizontal transfer circuit 41 via a level shifter 31 and a buffer 32. On the other hand, the vertical scanning circuit includes a vertical transfer circuit 22 for transferring a vertical start pulse VST, from one stage to a following stage starting from a first stage toward a final stage in response to a vertical clock signal VCK, and also includes a VCK generator 25 which generates a vertical clock signal VCK by processing a control pulse output from the final stage of the horizontal transfer circuit 41 and supplies the resultant vertical clock signal VCK to the vertical transfer circuit 22. There is also provided a vertical start pulse generator 24 for supplying the vertical start signal VST. The VST generator 24 may be constructed in a similar manner as described earlier.

Figure 9:
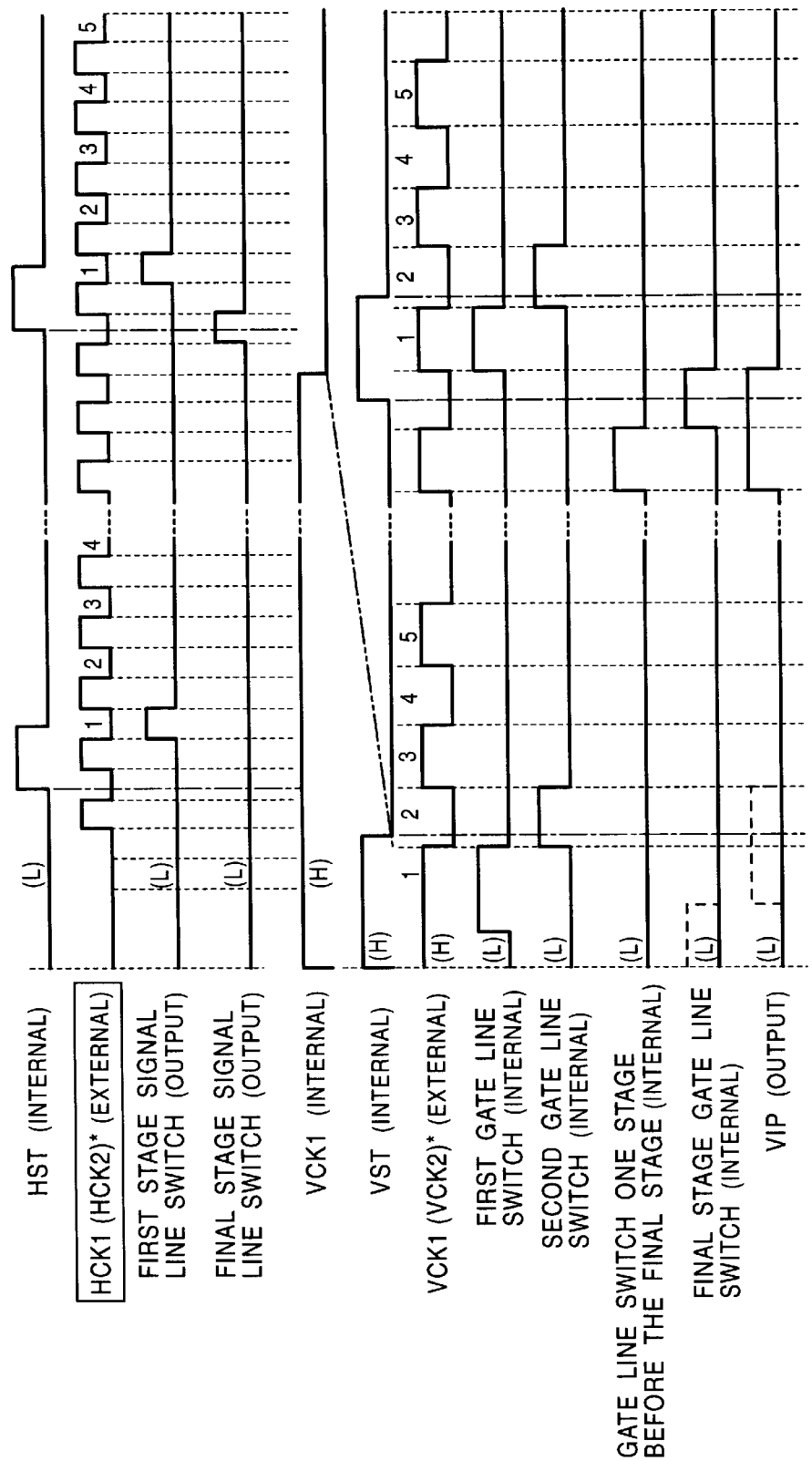
FIG. 9 is a timing chart illustrating the operation according to the second embodiment of the present invention.

FIG. 9 is a timing chart illustrating the operation of the circuit shown in FIG. 8. In the horizontal transfer circuit, a horizontal start signal HST is transferred in response to horizontal clock signals HCK1 and HCK2 thereby sequentially outputting control pulses. These pulses are sequentially supplied to signal line switches in a switch-by-switch fashion starting from the first-stage signal line toward the final-stage signal line switch. In response to a control pulse output from the final stage of the horizontal transfer circuit, vertical clock signals VCK1 and VCK2 are internally generated. In the vertical transfer circuit, the vertical start signal VST is transferred from one stage to a following stage in response to the vertical clock signals VCK1 and VCK2 thereby generating selection pulses. These selection pulses are supplied to the first-stage gate line switch, the second-stage gate line switch, . . . , the final-stage gate line switch, respectively. As described above, the main purpose of the present embodiment it is to provide, in a dot-to-dot transfer circuit, a circuit for generating a vertical driving signal (VCK signal) from an internal signal in response to inputting of a horizontal driving signal. A path is formed in the circuit such that upon completion of the operation of the horizontal transfer circuit (horizontal shift register), an operation associated with a next-stage vertical line (vertical gate) is started.

Because the first-stage gate line operates before the horizontal start signal (HST) is given, the first stage is operated by the initial input signal. The following stages are operated in response to a signal output from the final stage of the horizontal shift register. Therefore, in this circuit configuration, the vertical transfer circuit (vertical shift register) can operate without needing to input a transfer signal to the vertical transfer circuit from the outside. That is, a vertical clock signal VCK is latched with a timing provided by the horizontal shift register, and the gate line switches of the respective dots are controlled by the vertical clock signal VCK. This makes it possible to control the signal lines at correct points of time without encountering influences of an external signal delay and external noise. Therefore it becomes possible to provide a signal with a constant duty ratio and a constant delay and thus it becomes possible to realize a circuit having a large operating margin. Because VCK is internally generated in the circuit, no external system circuit is needed, and internal circuits such as a voltage multiplying circuit (level shifter) and a phase adjustment circuit become unnecessary. As a result, necessity of external signals and power consumption are minimized.

Figure 10:
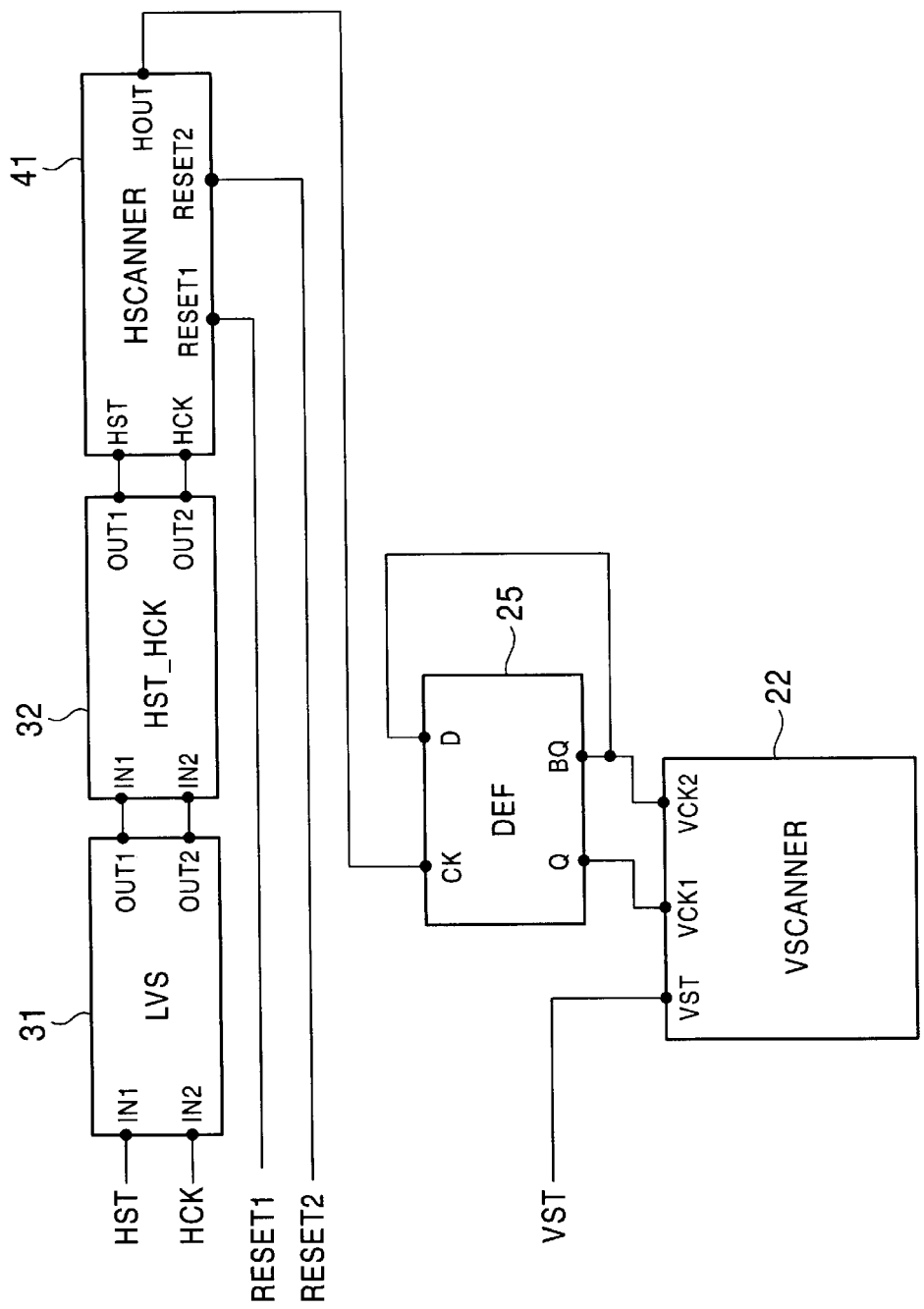
FIG. 10 is a diagram illustrating a specific example of a circuit according to the second embodiment of the present invention.

FIG. 10 is a block diagram illustrating a specific example of the configuration of the circuit shown in FIG. 8. In this example, the VCK generator 25 is formed of a D flip flop which receives a signal output from the final stage of the horizontal transfer circuit 41 and latches the received signal. In this circuit, the operation of selecting the signal output from the final stage should be performed taking into account the internal delay at the final stage, the propagation delay, and the timing of the latch at the first stage. This results in a certain amount of delay in the operation of the circuit, and thus a certain amount of delay in generating a signal.

Figure 11:
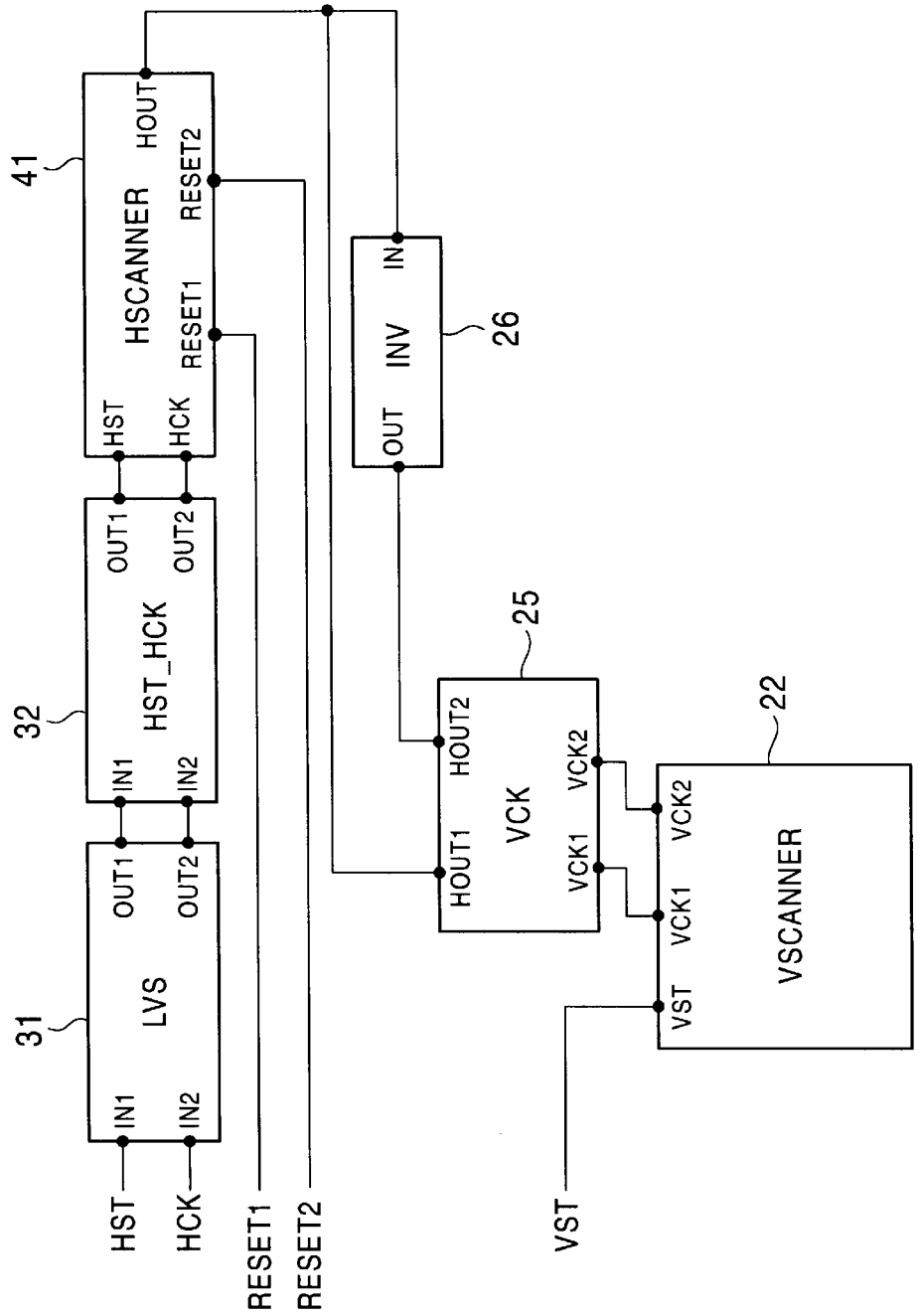
FIG. 11 is a diagram illustrating another specific example of a circuit according to the second embodiment of the present invention.

FIG. 11 illustrates an example of a circuit in which a VCK generator 25 performs a counting operation at a time when a signal output from the final stage of a horizontal scanning circuit is latched. The initial internal state is counted in response to a signal output from the final stage of the shift register of the horizontal scanning circuit. The state is inverted when the signal output from the final stage of the shift register of the horizontal scanning circuit is latched. After the initial state is established, the operation is performed with a small internal delay. The waveform can be adjusted at the point of time at which the signal is output. Also in this example, a path is formed in the circuit such that VCK is generated each time a signal is output from the final stage of the shift register thereby performing the transfer operation.

Figure 12:
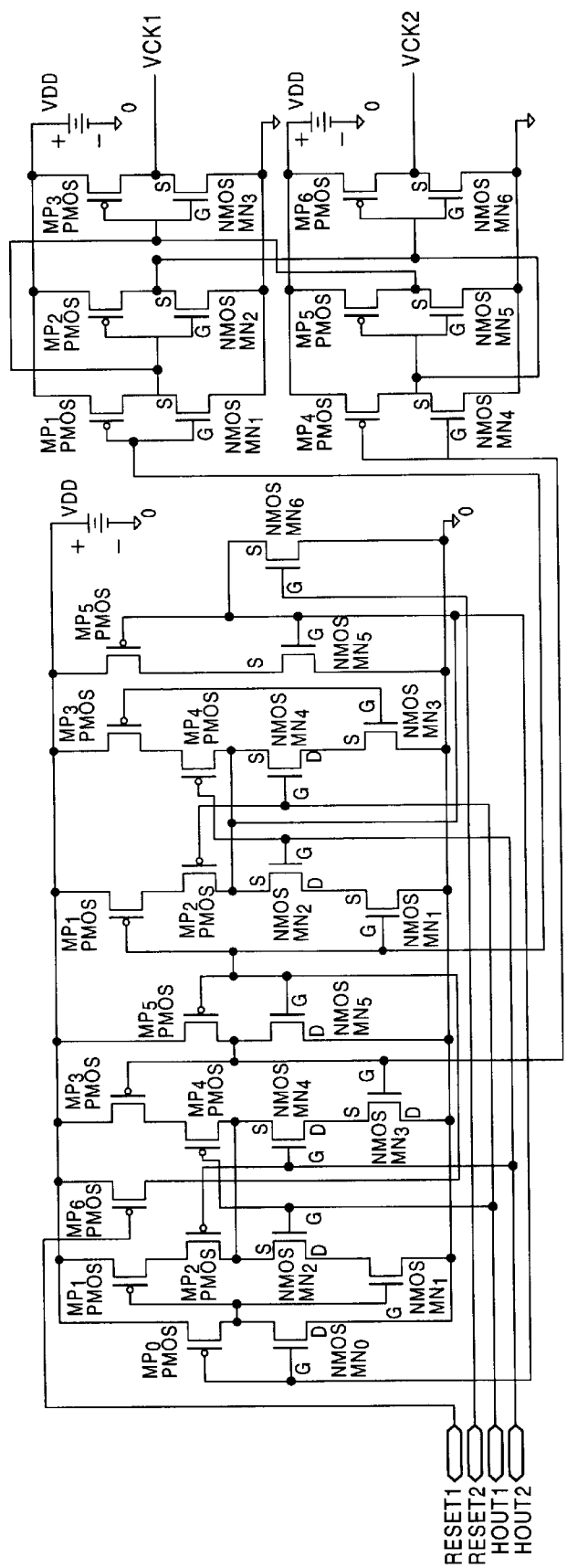
FIG. 12 is a diagram illustrating a further specific example of the configuration of the circuit shown in FIG. 11.

FIG. 12 illustrates a specific example of the configuration of the VCK generator 25 shown in FIG. 11. In this VCK generator 25, VCK1 and VCK2 are internally generated by processing control pulses HOUT1 and HOUT2 output from the final stage of the horizontal shift register. The VCK circuit is constructed in the CMOS configuration using a combination of n-channel thin-film transistors and p-channel thin-film transistors.

Figure 13:
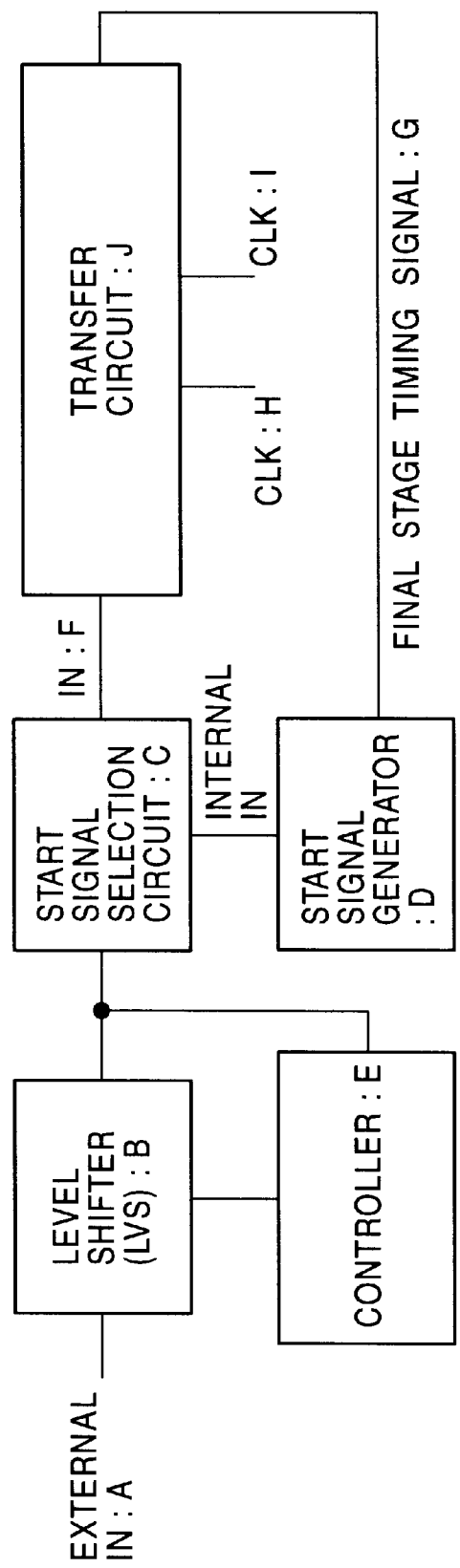
FIG. 13 is a block diagram illustrating a third embodiment of the present invention.

FIG. 13 is a block diagram illustrating an embodiment of an active matrix circuit according to the third aspect of the present invention, wherein, of various circuits in the active matrix circuit, a horizontal scanning circuit and associated circuits are shown in FIG. 13. As shown in FIG. 13, the horizontal scanning circuit includes a transfer circuit J for transferring, in response to a clock signal CLK, an input start pulse IN from a first stage to a final stage in a stage-by-stage fashion thereby generating a control pulse G and also includes a start pulse generating circuit D which internally generates a start pulse IN by processing a control pulse G output from the final stage of the transfer circuit J and applies the resultant start pulse IN to the first stage of the transfer circuit J. The horizontal scanning circuit further includes a level shifter B for stepping up the start pulse IN input from the outside and also includes a start signal selection circuit C which, when the operation is started, selects the external start pulse IN and supplies it to the transfer circuit J. The horizontal scanning circuit also includes a controller E for controlling the level shifter B and the start signal selection circuit C. If an external start pulse IN (A) is input from the outside, its voltage is stepped up by the internal voltage multiplying circuit B (level shifter) and the resultant signal is supplied (as the start signal F) to the transfer circuit J. Alternatively, the start signal may be directly supplied without being stepped up. In this case, however, it is needed to generate a start signal having a high voltage, the total power consumption of the system increases. The start signal is applied to the shift register J. After completion of the first transfer operation, the circuit is switched such that the start signal is internally generated during the following transfer operation. To this end, the controller E deactivates the level shifter B so that the input voltage is fixed. That is, it is needed to input the start signal from the outside only when the operation is started, it becomes unnecessary to input the start signal after the operation has been started. Therefore, the input voltage is fixed at a high or low level during the following transfer operation in which the start pulse is internally generated one by one via a loop circuit. The transfer operation can be started at any desired point of time. The part of the circuit serving to input the initial start signal is not needed to operate after inputting the initial start signal. This allows a reduction in the total power consumed by the system and makes it possible to form the circuit in a simple fashion. When a signal is output from the final stage, a next start signal is generated, and thus the transfer operation can be maintained without needing an external signal. Furthermore, the power consumption can be reduced by cutting off the external signal.

Figure 14:
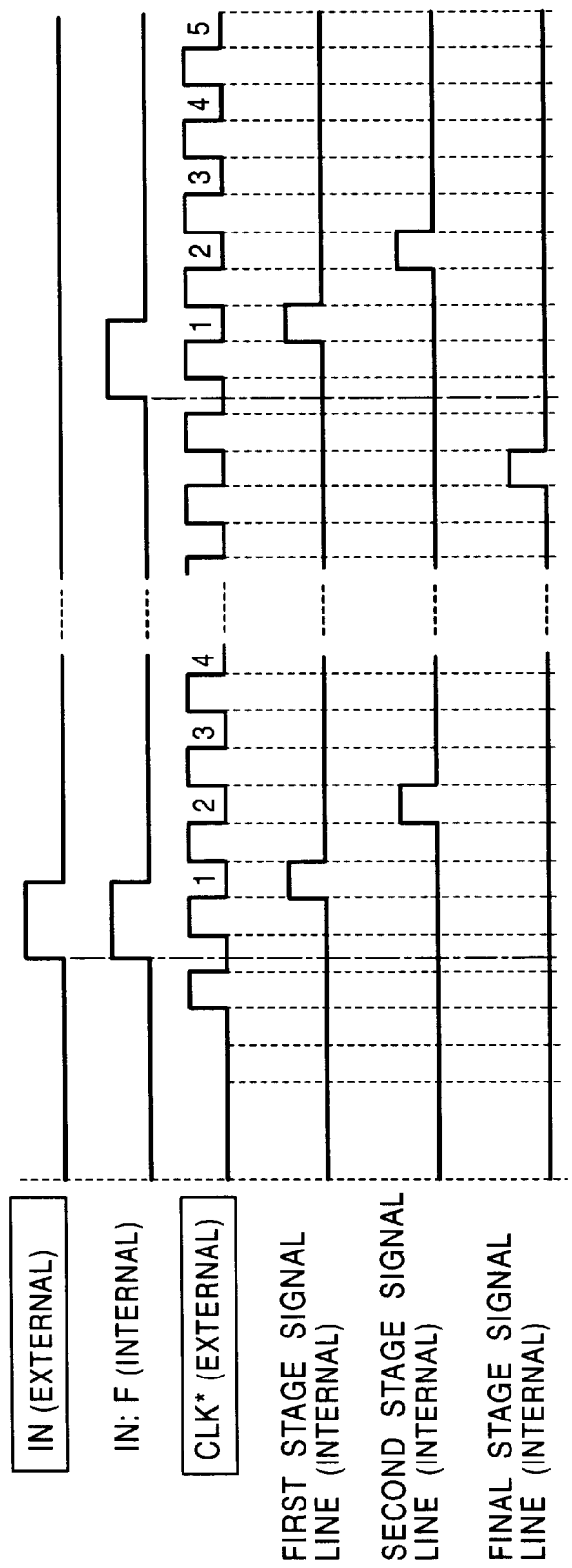
FIG. 14 is a timing chart illustrating the operation according to the third embodiment of the present invention.

FIG. 14 is a timing chart illustrating the operation of the circuit shown in FIG. 13. At the start of the operation, the start pulse IN input from the outside is transferred in a stage-by-stage fashion in response to the clock signal CLK thereby sequentially generating control pulses for controlling the on/off operation associated with the respective signal lines. When a control pulse corresponding to the final-stage signal line is output, a next start pulse IN is internally generated by processing the control pulse. In the following operation, the external start pulse IN is blocked, and the transfer operation is performed repeatedly using the internally generated start pulse. In the example shown in FIG. 14, a start signal is generated by latching a control pulse output from the final stage.

Figure 15:
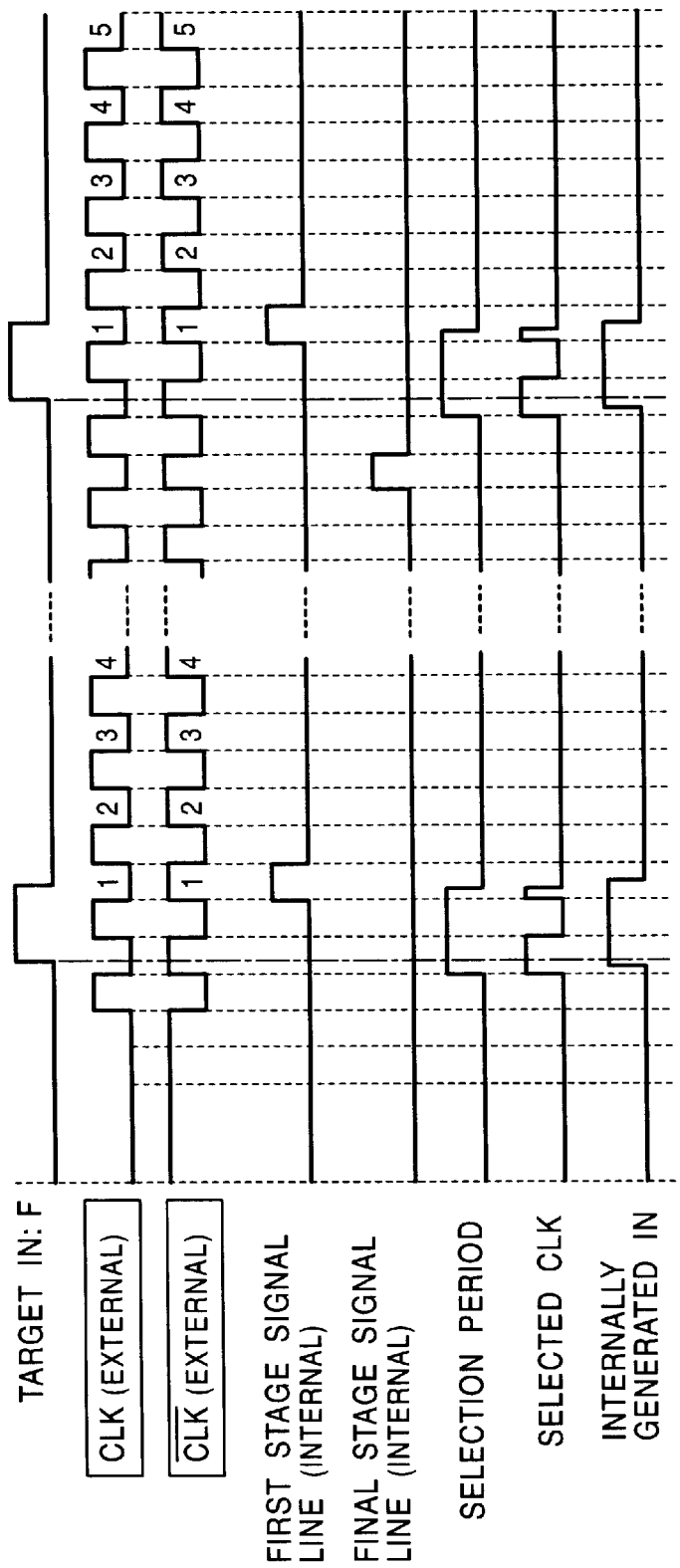
FIG. 15 is a timing chart illustrating the operation according to the third embodiment of the present invention.

FIG. 15 is a timing chart illustrating a modification of the operation of the circuit shown in FIG. 13. In this example, when a control pulse corresponding to the final-stage signal line is output, a selection period with a predetermined length is produced. A clock signal CLK is selected in this selection period, and a start pulse IN is internally generated by processing the selected clock signal.

Figure 16:
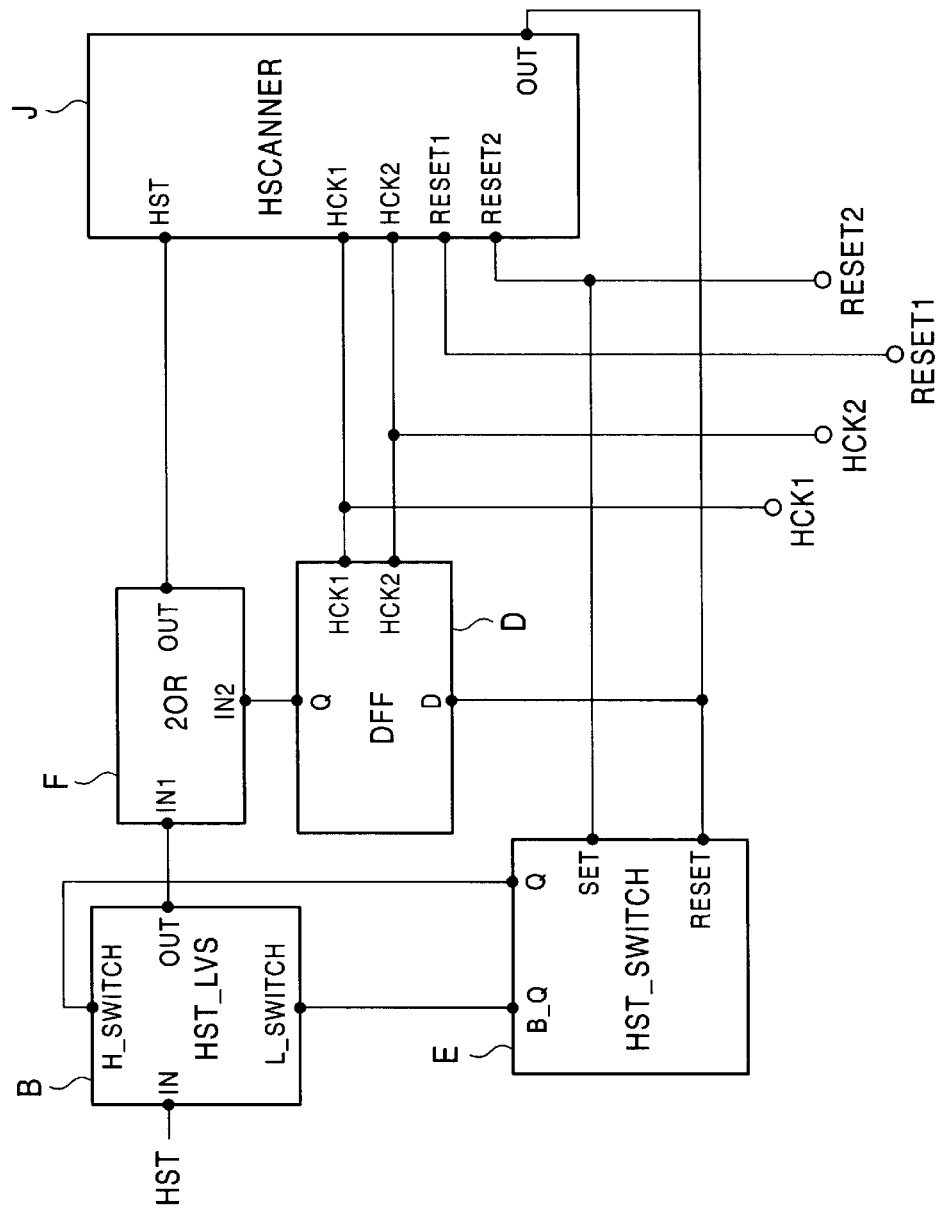
FIG. 16 is a diagram illustrating a specific example of a circuit according to the third embodiment of the present invention.

FIG. 16 illustrates a specific example of the configuration of the circuit shown in FIG. 13. This circuit operates in a similar manner as described above with reference to the timing chart shown in FIG. 14. In this example, a DFF is employed as the start signal generator D. A signal output from the final stage of the shift register is latched by the DFF in response to a clock signal CLK and a start signal is generated at a time at which the start signal should be supplied to the first stage. Herein, the operation of selecting the signal output from the final stage should be performed taking into account the internal delay at the final stage, the propagation delay, and the timing of the latch at the first stage.

Figure 17:
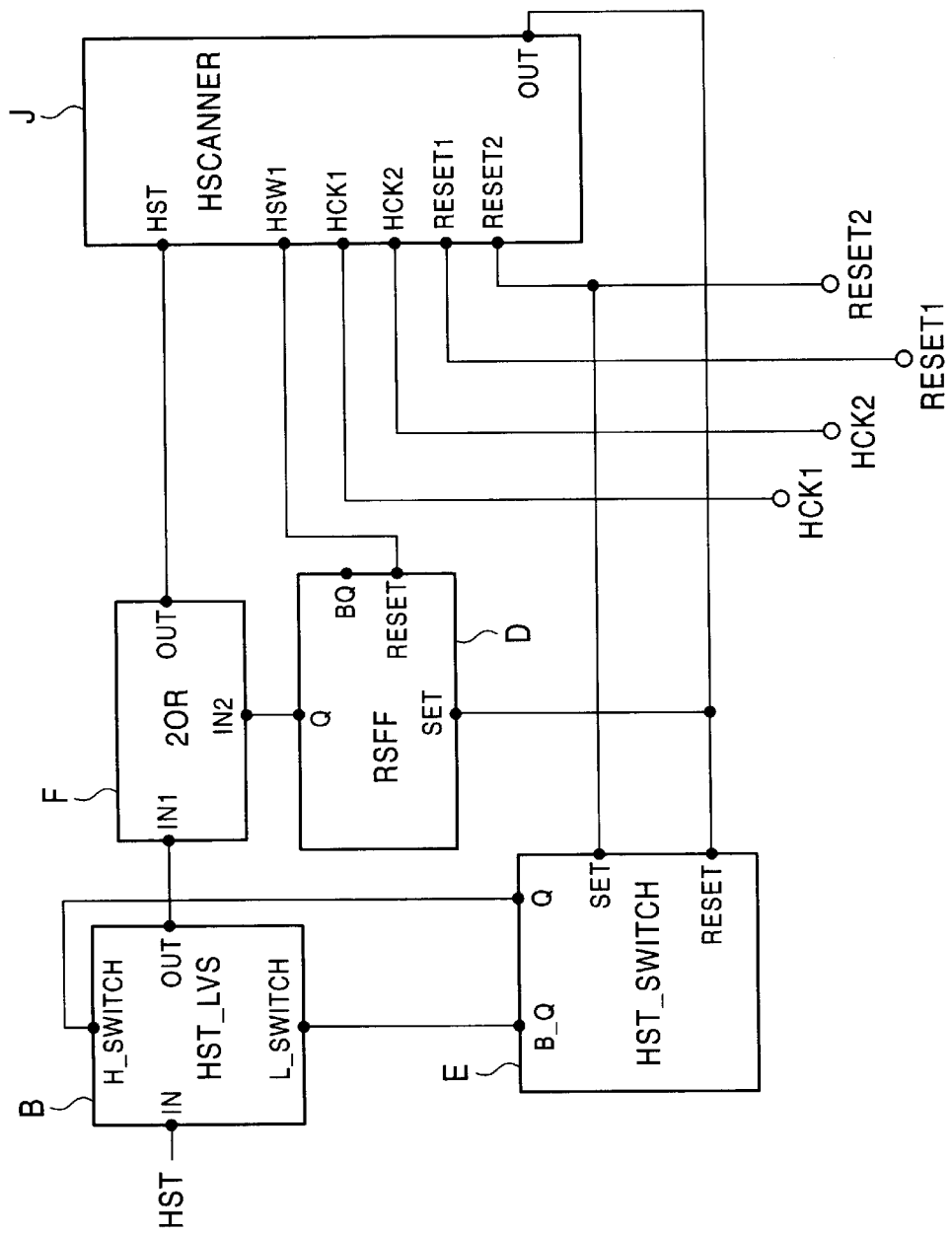
FIG. 17 is a diagram illustrating another specific example of a circuit according to the third embodiment of the present invention.

FIG. 17 illustrates another specific example of a configuration of the circuit shown in FIG. 13. This circuit operates in a similar manner as described above with reference to the timing chart shown in FIG. 14. In this example, an RSFF is employed as the start signal generator D. The RSFF raises up the start signal at a time at which a signal output from the final stage is latched and lowers the start signal at a time at which the transfer operation of the first stage is completed. That is, the start signal is started in response to the signal output from the final stage of the shift register and terminated in response to the signal output from the first stage of the shift register. Also in this circuit, the operation of selecting the signal output from the final stage should be performed taking into account the internal delay at the final stage, the propagation delay, and the timing of the latch at the first stage.

Figure 18:
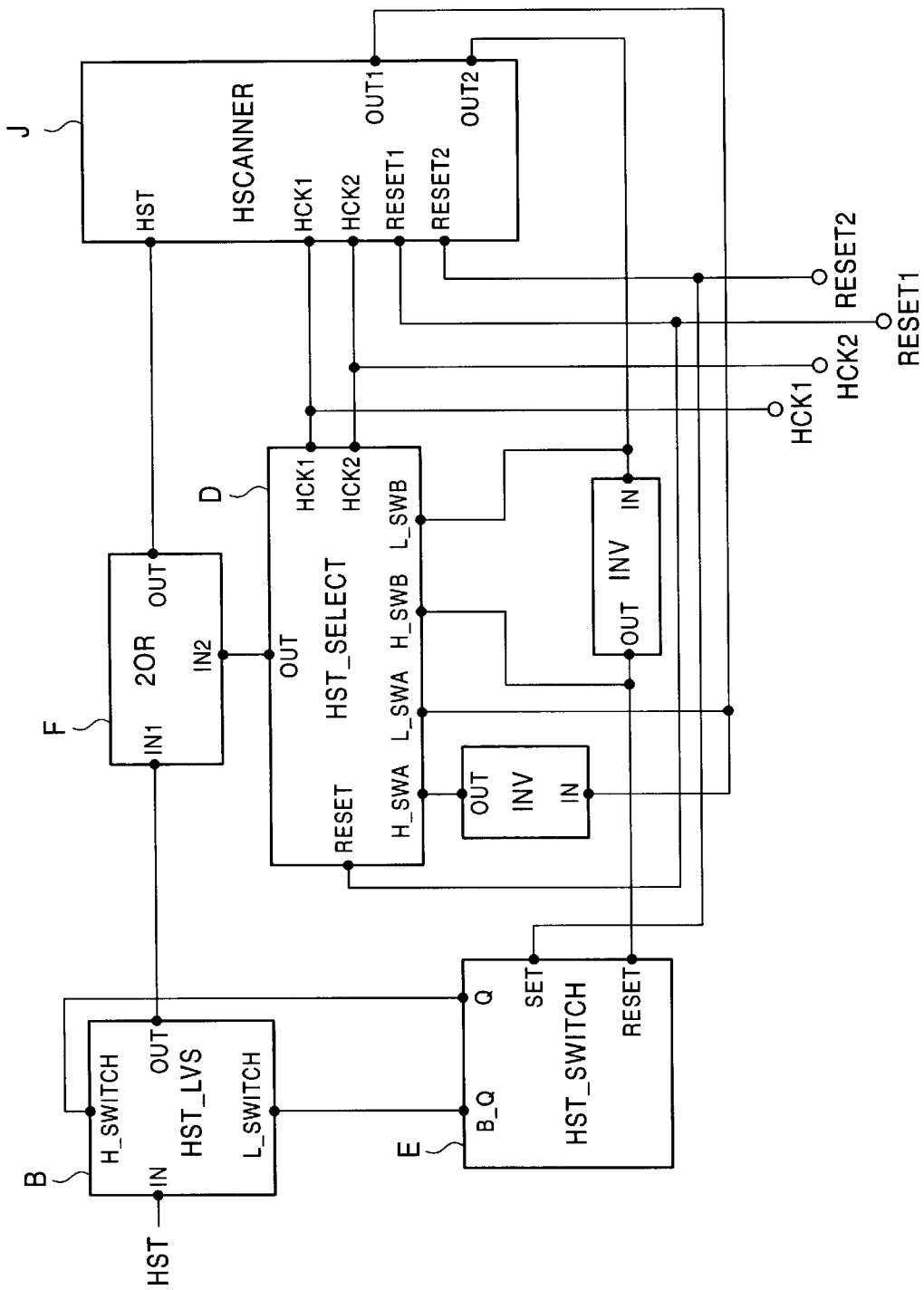
FIG. 18 is a diagram illustrating still another specific example of a circuit according to the third embodiment of the present invention.

FIG. 18 illustrates still another specific example of a configuration of the circuit shown in FIG. 13. This circuit operates in a similar manner as described above with reference to the timing chart shown in FIG. 15. In this example, a circuit serving as the start signal generator D generates a start signal from a reference clock signal (CLK) at a time at which a signal output from the final stage is latched. That is, a clock signal CLK is selected in response to a signal output from the final stage of the shift register, and a clock signal CK is also selected at a time at which the transfer operation of the first stage is completed, thereby outputting a start pulse from the RSFF. In this circuit, the delay is determined by the delay of the clock signal CLK input from the outside, and thus it is needed to select the clock signal CLK at a proper time. As described above, the operation is performed through a looped path such that a start signal is generated each time a signal is output from the final stage of the shift register.

Figure 19:
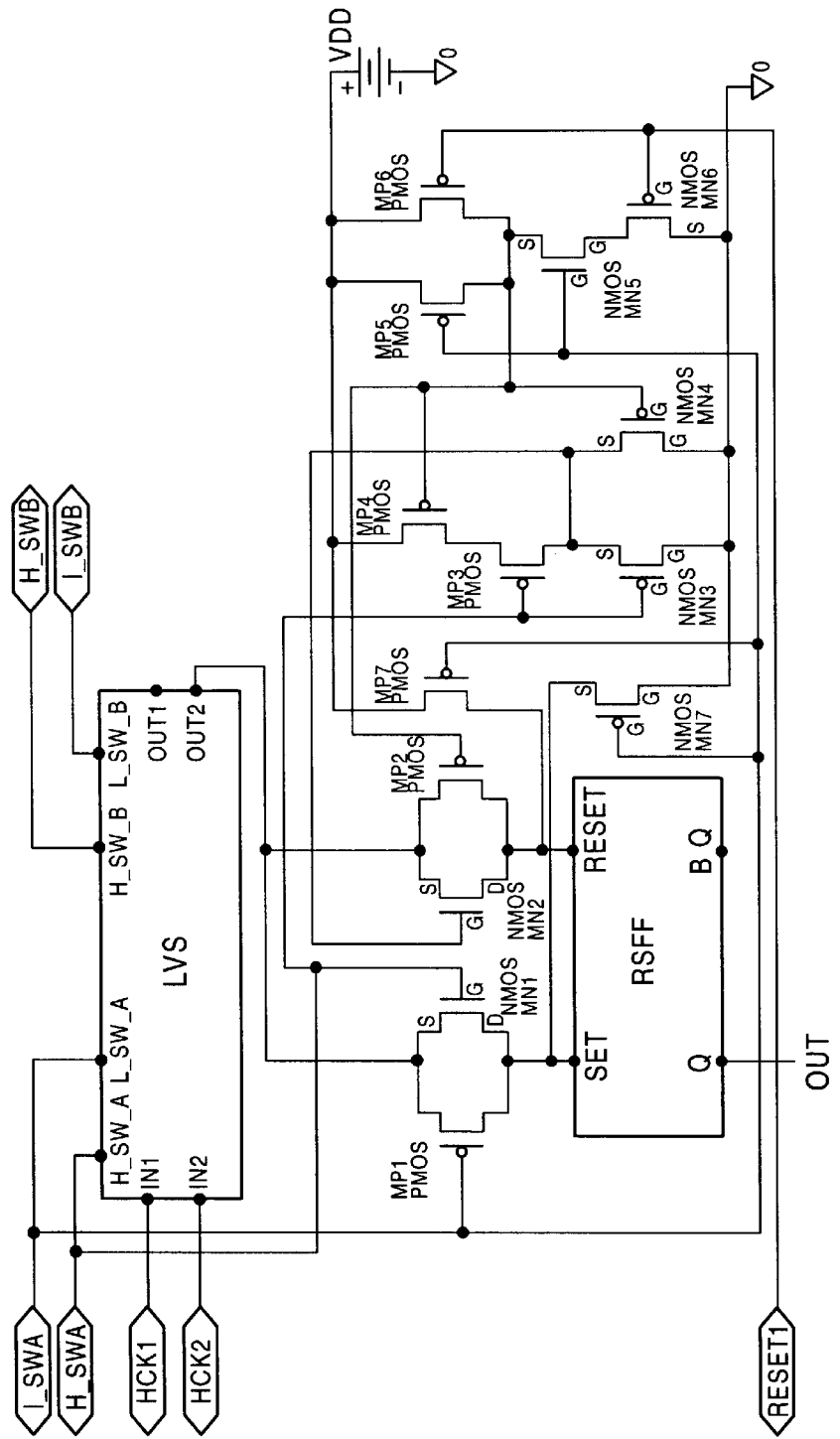
FIG. 19 is a circuit diagram illustrating a specific example of a configuration of the circuit shown in FIG. 18.

FIG. 19 illustrates a specific example of a circuit configuration of the start signal generator D shown in FIG. 18. This circuit is constructed in the CMOS configuration using a combination of n-channel thin-film transistors and p-channel thin-film transistors.

Figure 20:
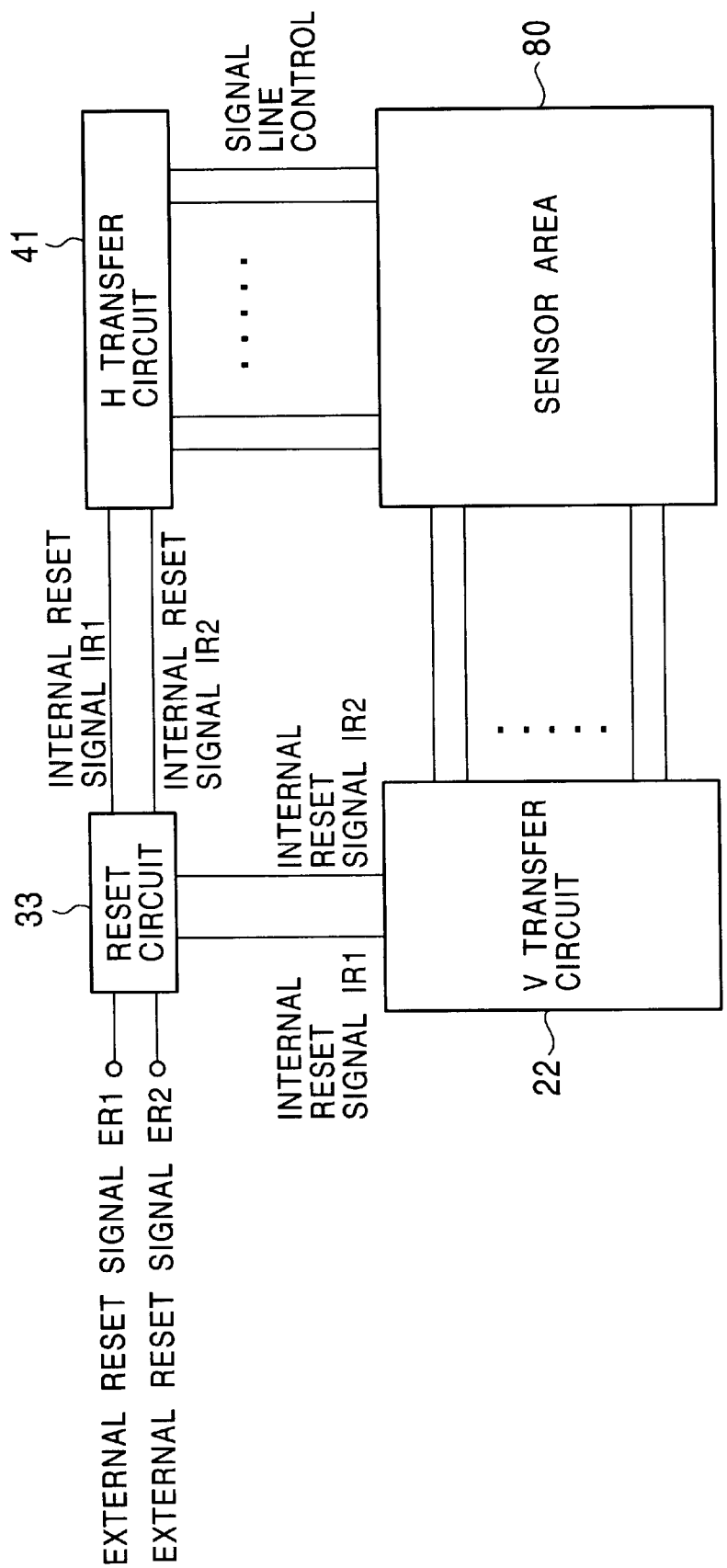
FIG. 20 is a block diagram illustrating a fourth embodiment of the present invention.

FIG. 20 is a block diagram illustrating an embodiment of an active matrix circuit according to the fourth aspect of the present invention. In this active matrix circuit, a horizontal scanning circuit includes a horizontal transfer circuit 41 for transferring a horizontal start pulse from a first stage to a final stage in a stage-by-stage fashion in response to a horizontal clock signal thereby outputting a control pulse. A vertical scanning circuit includes a vertical transfer circuit 22 for transferring a vertical start pulse from a first stage to a final stage in a stage-by-stage fashion in response to a vertical clock signal. The above horizontal transfer circuit 41 and vertical transfer circuit 22 are connected to a sensor area 80. This active matrix circuit is characterized in that it further includes a reset circuit 33 for, in response to a reset pulse supplied from the outside, forcedly resetting the horizontal transfer circuit 41 and the vertical transfer circuit 22 into their initial states.

Figure 21:
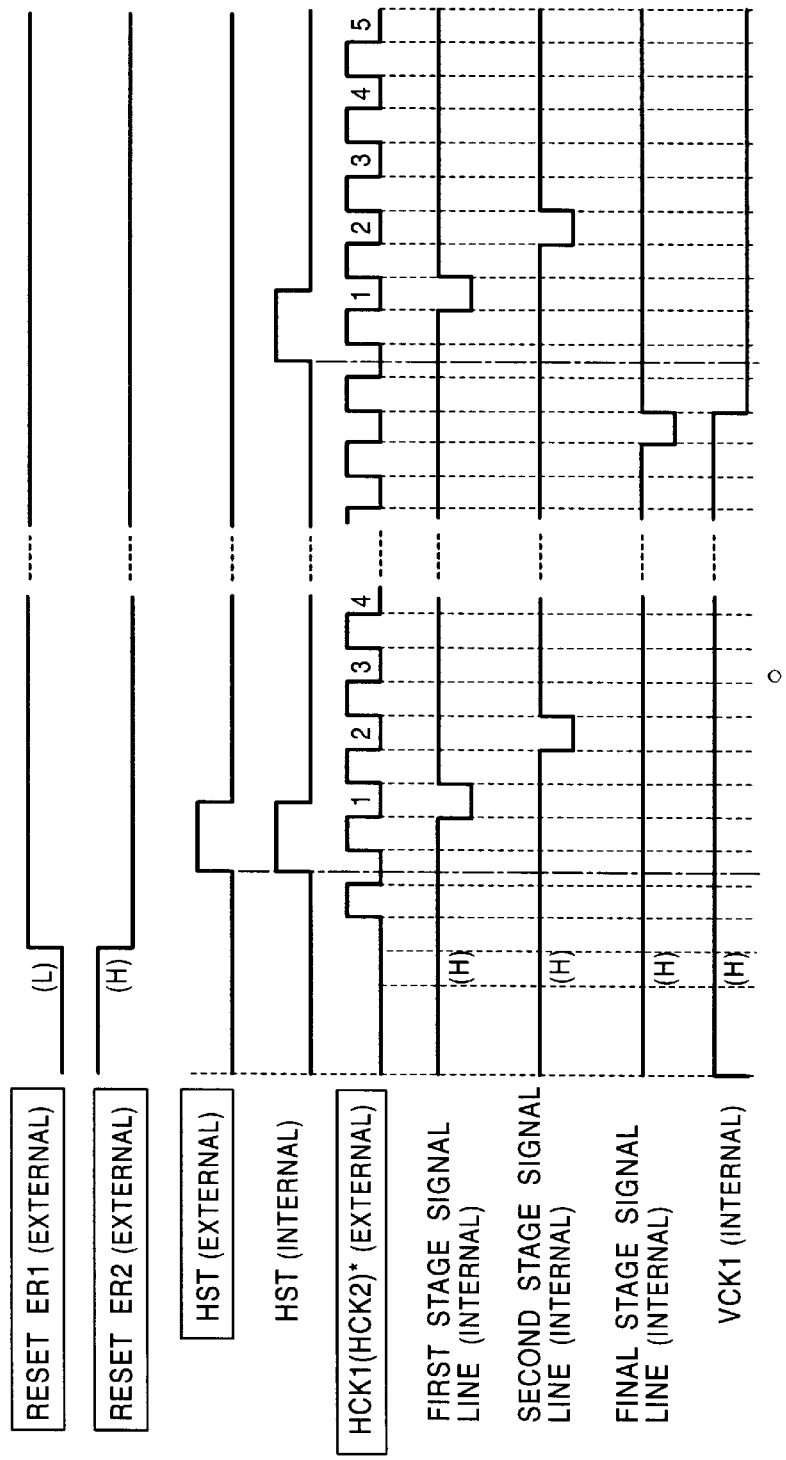
FIG. 21 is a timing chart illustrating the operation according to the fourth embodiment of the present invention.

FIG. 21 is a timing chart illustrating the operation of the circuit shown n FIG. 20. First, the vertical transfer circuit 22 and the horizontal transfer circuit 41 are both initialized by reset signals RESET1 and RESET2 input from the outside. After that, in response to HCK1 and HCK2 supplied from the outside, HST is transferred through the horizontal transfer circuit 41 in a stage-by-stage fashion thereby outputting control pulses corresponding to the respective signal lines. If a control pulse is output from the final stage of the horizontal transfer circuit 41, a next horizontal start signal HST is internally generated in response to the control pulse. At the same time, a vertical clock signal VCK is also internally generated. The vertical transfer circuit 22 operates in a similar manner to the horizontal transfer circuit 41. That is, after being forcedly initialized by a reset pulse, a vertical start signal VST is transferred through the vertical transfer circuit 22 in response to a vertical clock VCK thereby sequentially outputting selection pulses over the respective selection lines.

As described above, before starting the transfer operation, the data in the transfer circuit (shift register) is initialized by the reset pulse. The initial setting signal is input from the outside, and signals needed to start the transfer operation are input. When the initialization signal (reset signal) is input, the voltages in the horizontal shift register and the vertical shift register are reset in the initial values at a high or low level. In accordance with the initialized states of the horizontal shift register and the vertical shift register, the states of peripheral circuits (signal line control switches, level shifters) are also initialized. Thus, dots (pixels) which are controlled by the horizontal shift register and the vertical shift register are initialized when the first dot at the first stage is started. That is, if transfer signals such as HST and HCK are input, a first dot signal at the first stage is output or input and the transfer operation is started. Because the initialization is performed over the entire circuit, the circuit includes no uncertain state. This prevents the circuit from starting from an uncertain state such as a middle level of a level shifter and also prevents an overlapping signal from being input or output to or from circuit. Thus, it is possible to correctly start a transfer operation to read/write data immediately after inputting a reset signal. If a reset signal is input in the middle of a transfer operation, the shift register is initialized and the transfer operation is restarted from the first stage. In this circuit, it is possible to input or output data in a very short time, and no waiting time is needed to sweep out invalid data.

Figure 22:
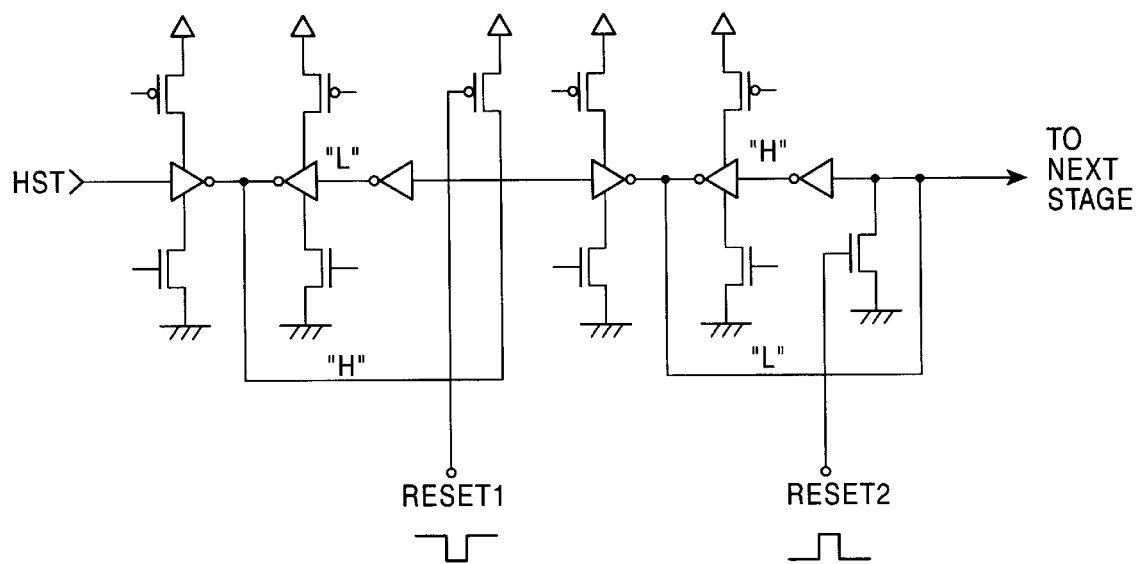
FIG. 22 is a diagram illustrating a specific example of a circuit according to the fourth embodiment of the present invention.

FIG. 22 is a diagram illustrating a specific example of a circuit configuration of the reset circuit 33 shown in FIG. 20. A similar reset circuit is disposed at each stage of the shift register of the transfer circuit. In the circuit shown in FIG. 22, a current passing through thin film transistors is controlled to generate a reset signal. In this technique, although the circuit consumes large power, quick circuit initialization is possible, and the circuit load is low when the initializing operation is not performed. Thus, this circuit has a small delay and a small influence upon the timings in the transfer operation. In FIG. 22, symbols "H" and "L" denote the voltage levels in the resetting operation.

Figure 23:
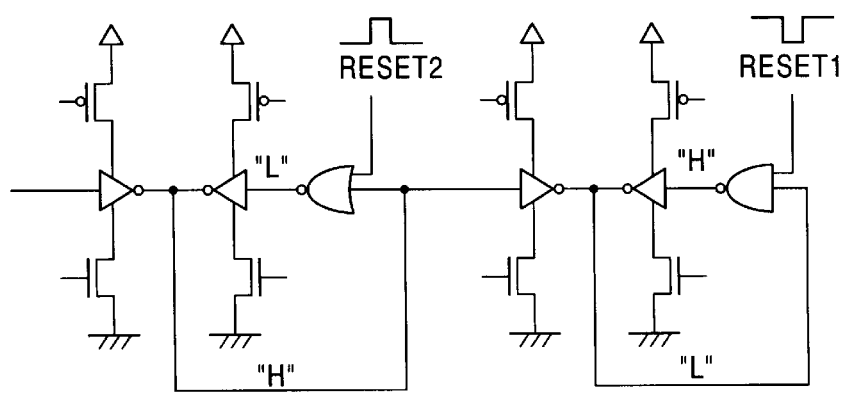
FIG. 23 is a diagram illustrating another specific example of a circuit according to the fourth embodiment of the present invention.

FIG. 23 is a diagram illustrating another specific example of a circuit configuration of the reset circuit 33 shown in FIG. 20. This reset circuit is also disposed at each stage of the shift register. In this circuit, initialization is performed by means of logic gates in which transition in voltages of respective transistors into fixed levels needs only a current for charging loads such as capacitors and resistors and thus consumes low power. However, a rather large delay occurs when a signal passes through this circuit, and thus this delay can influence the timing of the operation of the shift register. Therefore, this reset circuit is useful when the delay does not cause a problem in the operation.

Figure 24:
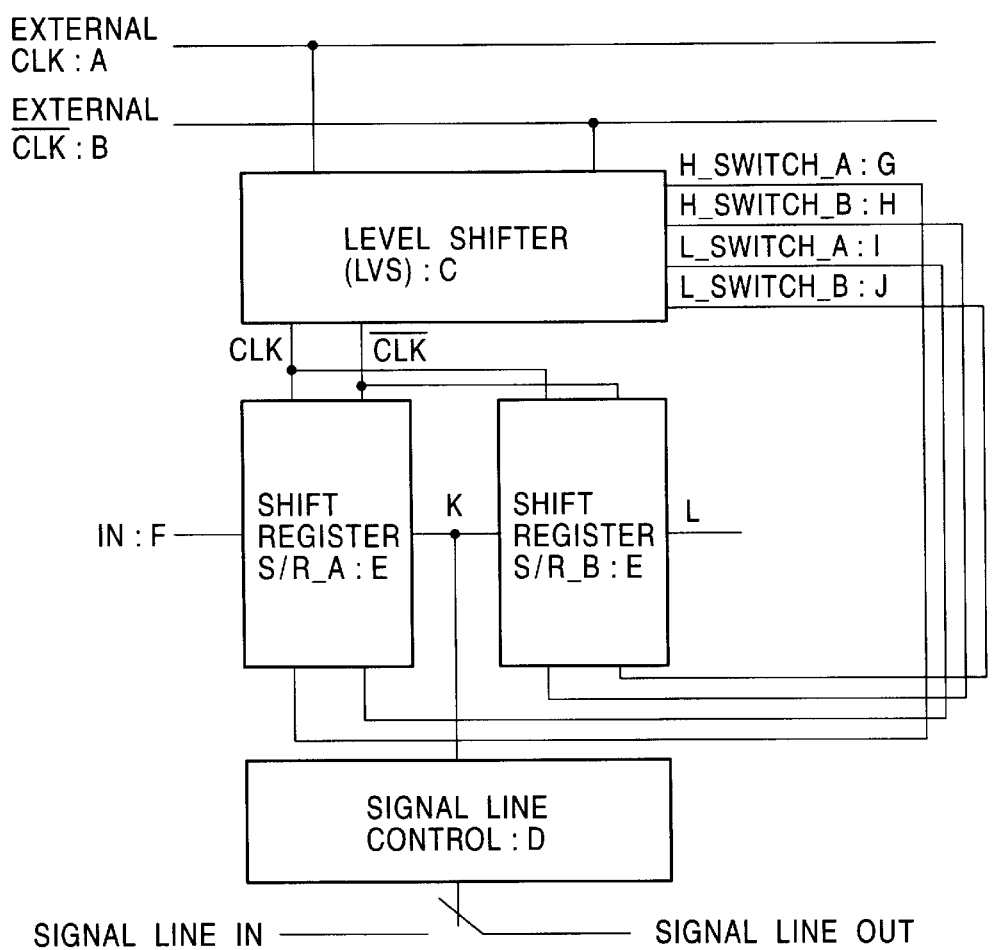
FIG. 24 is a block diagram illustrating a fifth embodiment of the present invention.

FIG. 24 is a block diagram illustrating an embodiment of an active matrix circuit according to the fifth aspect of the present invention. This active matrix circuit includes a voltage multiplying circuit for stepping up a low-voltage clock signal (external clock signal CLK) input from the outside and supplying a resultant high-voltage clock signal to respective stages of the shift registers (stages of the shift registers A and B in FIG. 24). The voltage multiplying step includes level shifters C disposed at respect stages of the transfer circuits, for individually stepping up a clock signal CLK. Each level shifter C performs a stepping-up operation in synchronization with the transferring operation of a corresponding stage E of the transfer circuits. The on-off transition of each level shifter C is directly controlled by a pulse output from a corresponding stage E of the transfer circuits. The control pulses output from the respective stages E of the transfer circuit is supplied via a signal line control circuit D to switches for turning on and off the respective signal lines.

Figure 25:
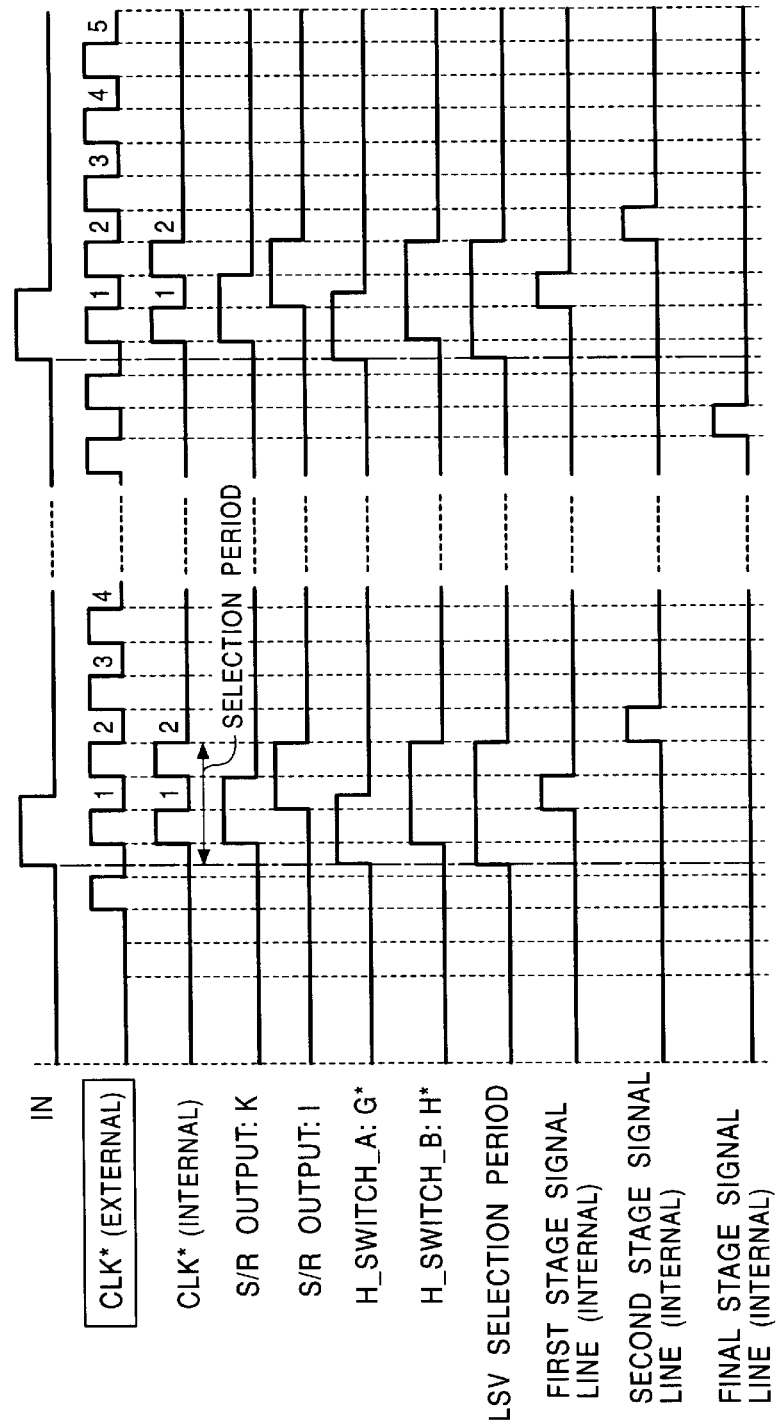
FIG. 25 is a timing chart illustrating the operation according to the fifth embodiment of the present invention.

FIG. 25 is a timing chart illustrating the operation of the level shifter (C) shown in FIG. 24. Each stage E of the transfer circuits (shift registers) starts a transfer operation when a transfer start signal (IN) is input. The level shifter C includes a control switch for starting the operation of the voltage multiplying circuit (level shifter) at the same time as the start of the operation of the shift register. More specifically, the operation of the level shifter C is controlled by control signals H_SWITCH and L_SWITCH applied to the level shifter C. The voltage amplitude of the external signal (external CLK) is stepped up by the level shifter C and a resultant signal is output as a transfer latch signal (internal CLK) from the level shifter C. In response to CLK, the shift register E starts the transfer operation. At the same time, a control pulse K is output to the signal line. The internal clock signal (internal CLK) is output from the level shifter C via a buffer, wherein the buffer size of the buffer and the transistor size of transistors in the buffer are optimized depending upon the fan out so as to be capable of properly supplying the internal clock signal. The stepping-up of CLK is performed immediately before CLK is used. When the transfer operation of the shift register is completed, the control signals H_SWITCH and L_SWITCH are changed to low and high levels, respectively. Because the level shifter C is deactivated after the shift register itself outputs the control pulses, the control of the latching operation of CLK at the final stage is internally performed in the level shifter itself thereby deactivating the level shifter at the final stage. After the level shifter C is deactivated, voltage level of the clock signal CLK of each stage of the shift register is fixed such that the transfer state is held. For example, the clock signal CLK is fixed at a high level. After the completion of the transfer operation, the shift register is in a static state and the shift register does not respond to an external signal HCK. As described above, because stepping-up of the voltage of the clock signal is started in synchronization with starting of the transfer operation and the voltage of the voltage multiplying circuit is fixed at a DC level in synchronization of the completion of the transfer operation, the clock signal is not applied to the shift register after the completion of the transfer operation and thus a transient current is minimized. Because the low-voltage clock signal input from the outside is not stepped-up until immediately before it is used, attenuation and delay of the signal which occur when the signal passes through the circuit are minimized. Because the level shifter is controlled by the control signal output from the shift register, the buffer of the level shifter can be optimized to drive the minimum load imposed during the operation of the shift register. Furthermore, an overlapping period in which both adjacent level shifters operate can be minimized and thus the power consumption can be reduced. Because the stepping-up is performed immediately before the transfer operation is started, the size of the level shifter can be reduced while maintaining the capability of outputting a shaped signal with a small deviation of the duty ratio and with a small delay.

Figure 26:
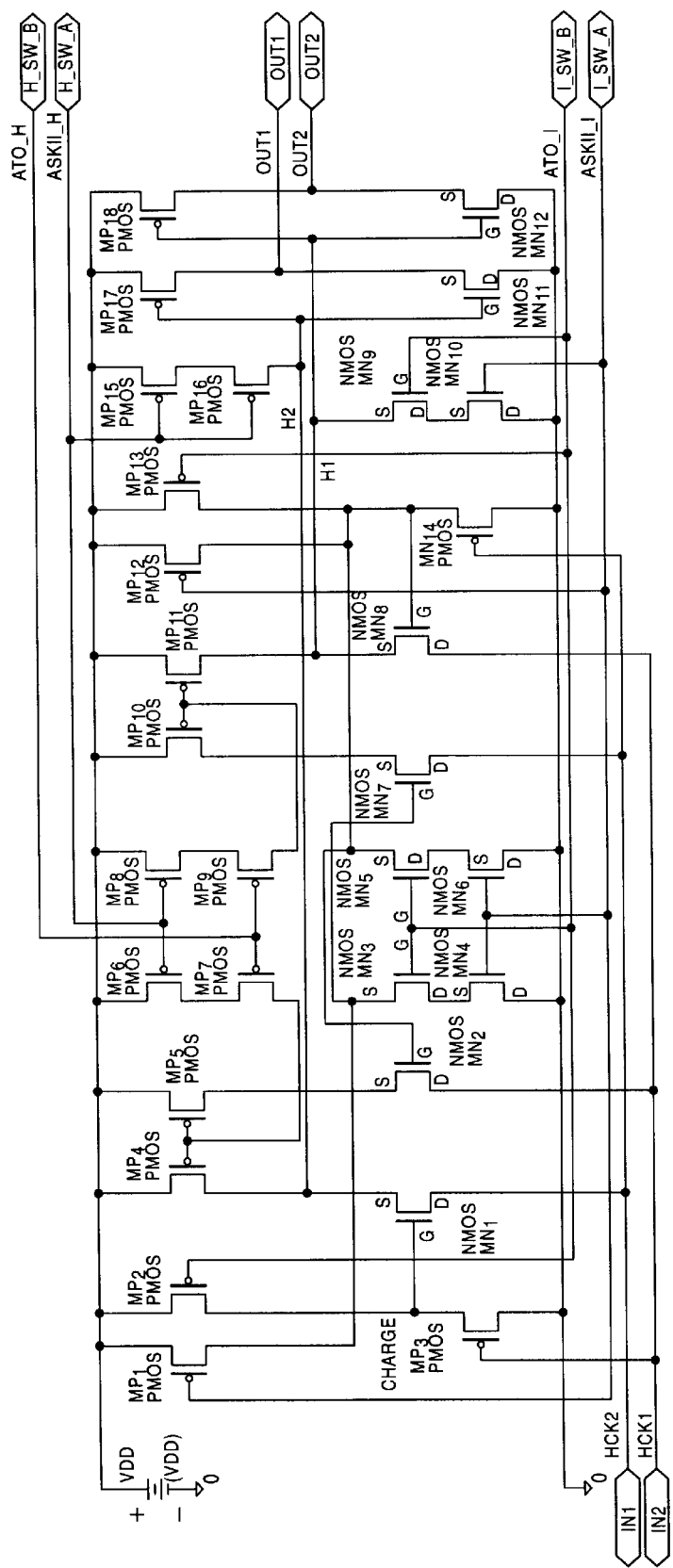
FIG. 26 is a diagram illustrating a specific example of a circuit according to the fifth embodiment of the present invention.

FIG. 26 is a diagram illustrating a specific example of a circuit configuration of the level shifter C shown in FIG. 24. This circuit is constructed in the CMOS configuration using a combination of n-channel thin-film transistors and p-channel thin-film transistors. In FIG. 26, low-voltage clock signals, which are input from the outside and which are opposite in phase to each other, are denoted by IN1 and IN2, and high-voltage clock signals obtained through the stepping-up operation are denoted by OUT1 and OUT2.

Figure 27:
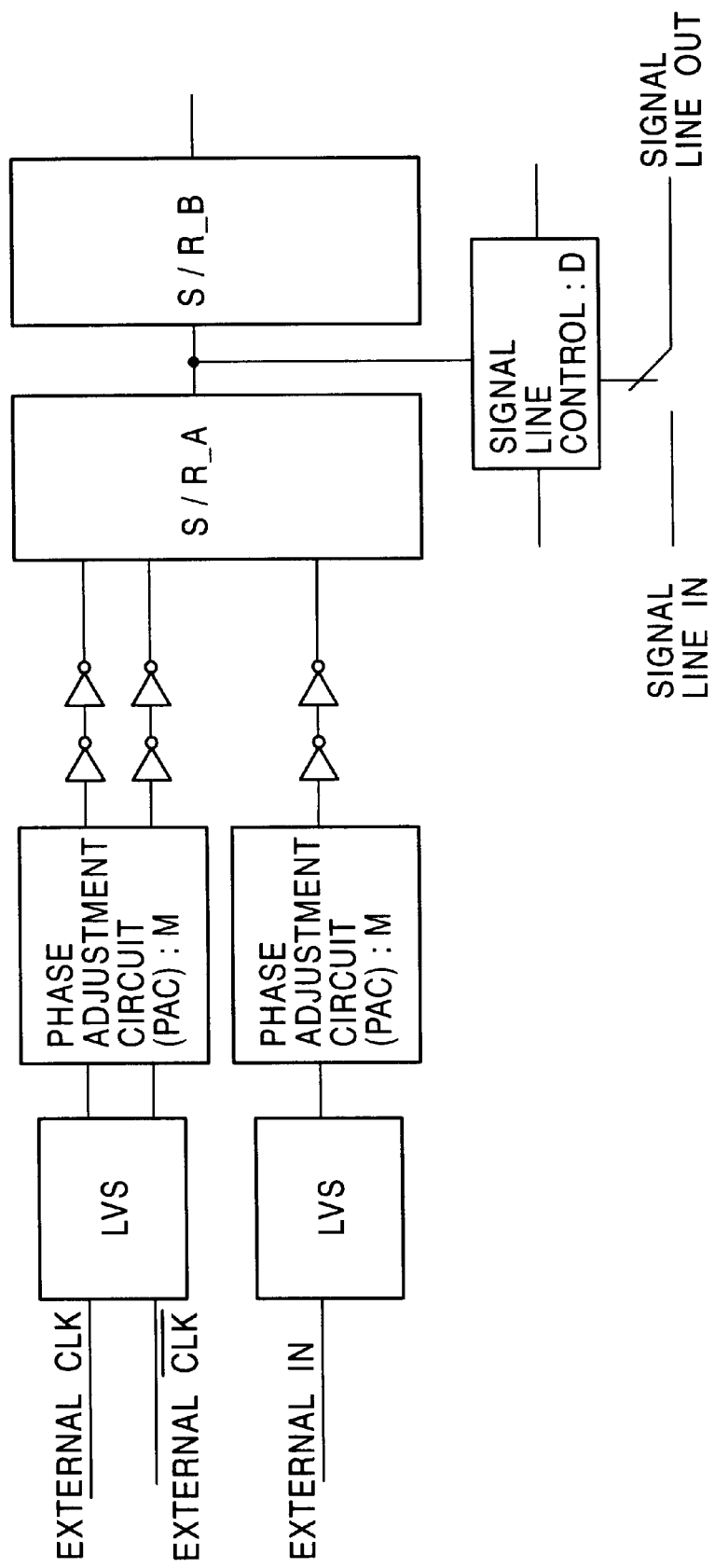
FIG. 27 is a block diagram illustrating a comparative example of an active matrix circuit.

FIG. 27 is a block diagram illustrating a comparative example of a level shifter (LVS). In this example, level shifters LVS are disposed at an end of a circuit, and a buffer including several stages having the capacity of driving a maximum interconnection load is disposed. The duty ratio varies depending upon the characteristics of n-channel and p-channel transistors in the buffer. Phase adjustment circuit M are disposed to compensate for the variation in the duty ratio. Furthermore, in this circuit, a transient operation always occur in the final buffer stage with a large size, and thus large power is consumed by the buffer. The clock signal CLK is supplied to the shift register even in a period in which no transfer operation is performed, and thus large power is consumed by the level shifter. Large loads are imposed upon the first and final stages of the shift register during the transfer operation, and thus large delays occur. Furthermore, due to a reduction in the voltage amplitude, the control of thresholds becomes very critical in the transfer operation of the shift register, and thus the operation margin becomes very small. Because one level shifter is not provided for each shift register, dummy shift registers which are not directly concerned with the transfer operation are needed to be added to the first and final stages of the transfer circuit, and thus the circuit size increases and power is wasted.

Figure 28:
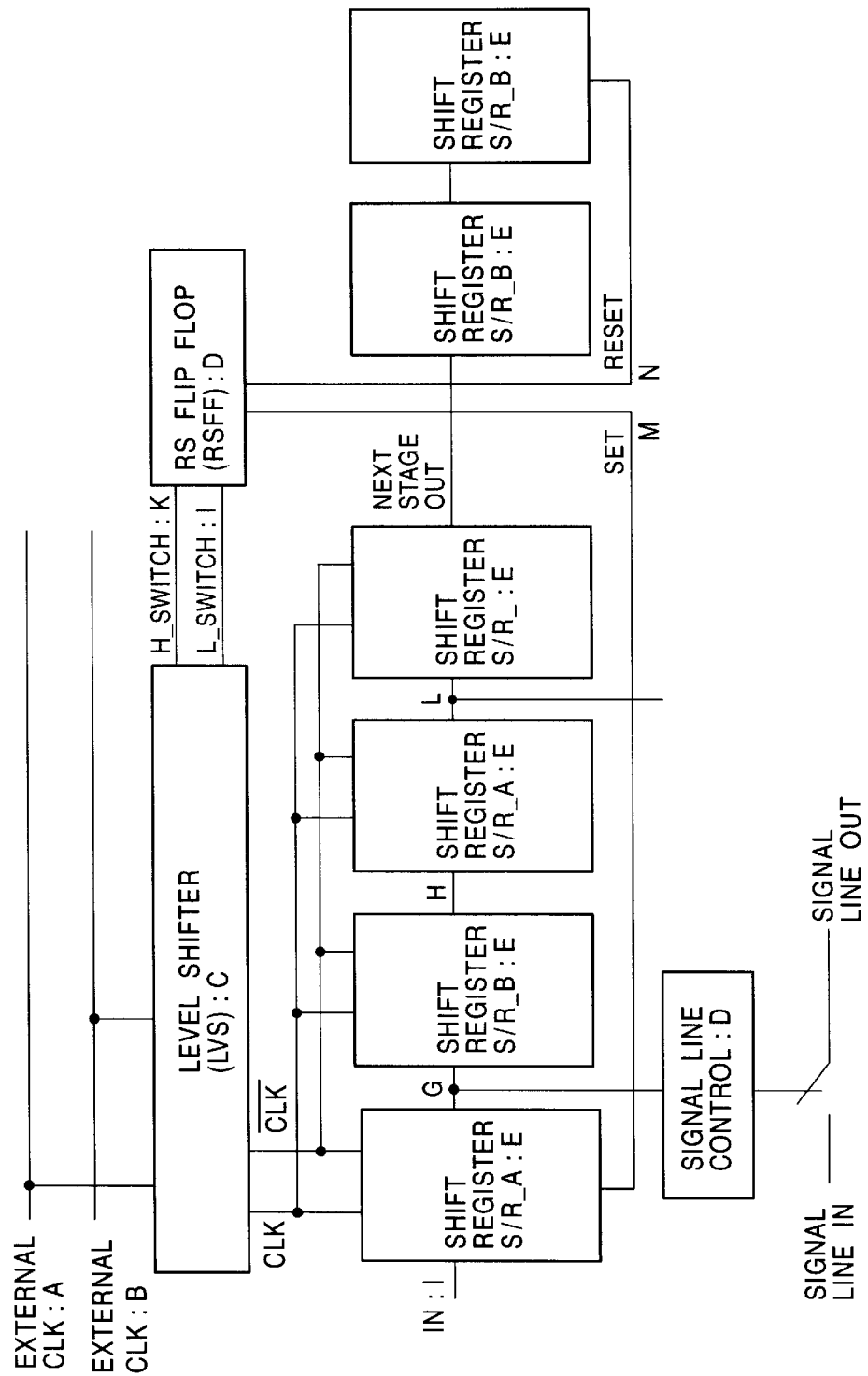
FIG. 28 is a block diagram illustrating a sixth embodiment of the present invention.

FIG. 28 is a block diagram illustrating an example of a configuration of an active matrix circuit according to the sixth aspect of the present invention. The circuit configuration of this active matrix circuit is basically similar to that of the circuit shown in FIG. 24 except that the voltage multiplying circuit includes a level shifter C for individually stepping up a clock signal CLK for a set of two or more stages of a transfer circuit. That is, in contrast to the previous example in which one level shifter is provided for each stage of the shift register, the present example of the circuit has one level shifter for each set of, for example, two stages of the shift register. Each level shifter C performs the stepping-up operation in synchronization with the transfer operation of a corresponding set of two or more stages of the transfer circuit.

Figure 29:
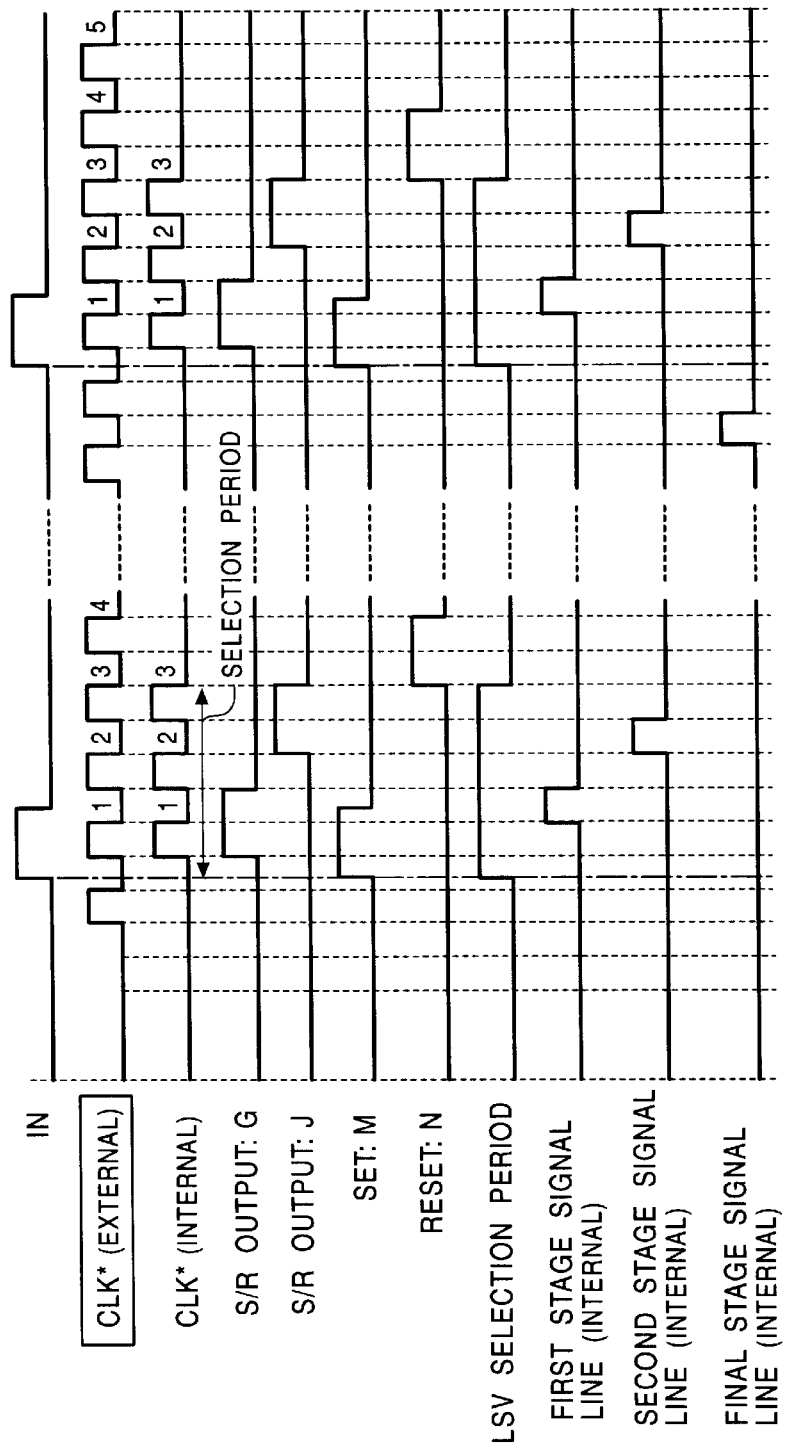
FIG. 29 is a timing chart illustrating the operation according to the sixth embodiment of the present invention.

FIG. 29 is a timing chart illustrating the operation of the circuit shown n FIG. 28. The operation of the circuit according to the present embodiment is described below with reference to FIG. 29 and FIG. 28. The transfer circuit (shift register E) starts a transfer operation when a transfer start signal (IN) is input. In the case where an RS flip flop D is employed as a circuit for controlling the level shifter C, a set signal (denoted by M in FIG. 28) is applied from the shift register to the RS flip flop D. In response, the RS flip flop D outputs a control signal H_SWITCH (K) with a high level and a control signal L_SWITCH (L) with a low level to the level shifter E thereby activating it. The voltage of the external driving signal (external CLK) is stepped up by the level shifter and the resultant signal is output as a transfer latch signal (CLK) from the level shifter. The shift register starts the transfer operation in response to CLK. At the same time, a control signal for controlling a signal line is also output. The transfer latch signal (internal CLK) is output from the level shifter C via its buffer, wherein the buffer size of the buffer and the transistor size of transistors in the buffer are optimized depending upon the load to be driven by the buffer. The level shifter C starts the stepping-up operation immediately before the corresponding set of stages of the transfer circuit starts its operation. When the set of stages of the shit register has completed its operation which was started in response to CLK supplied via the level shifter, a reset signal (denoted by N in FIG. 28) is applied to the RSFF from the shift register. As a result, the control signals H_SWITCH and L_SWITCH are changed into low and high levels, respectively, and the operation of the level shifter is disabled. As a result, the voltage of the respective clock signal applied to the shift register is fixed so that the transfer state of the shift register is held. After the completion of the transfer operation, the shift register is in a static state and the shift register does not respond to external CLK. As described above, use of one level shifter for one set of two or more stages of the transfer circuit allows a reduction in the circuit complexity compared with a case in which one level shifter is used for each stage of the transfer circuit. This circuit configuration is useful in particular when it is applied to middle stages of the transfer circuit.

Figure 30:
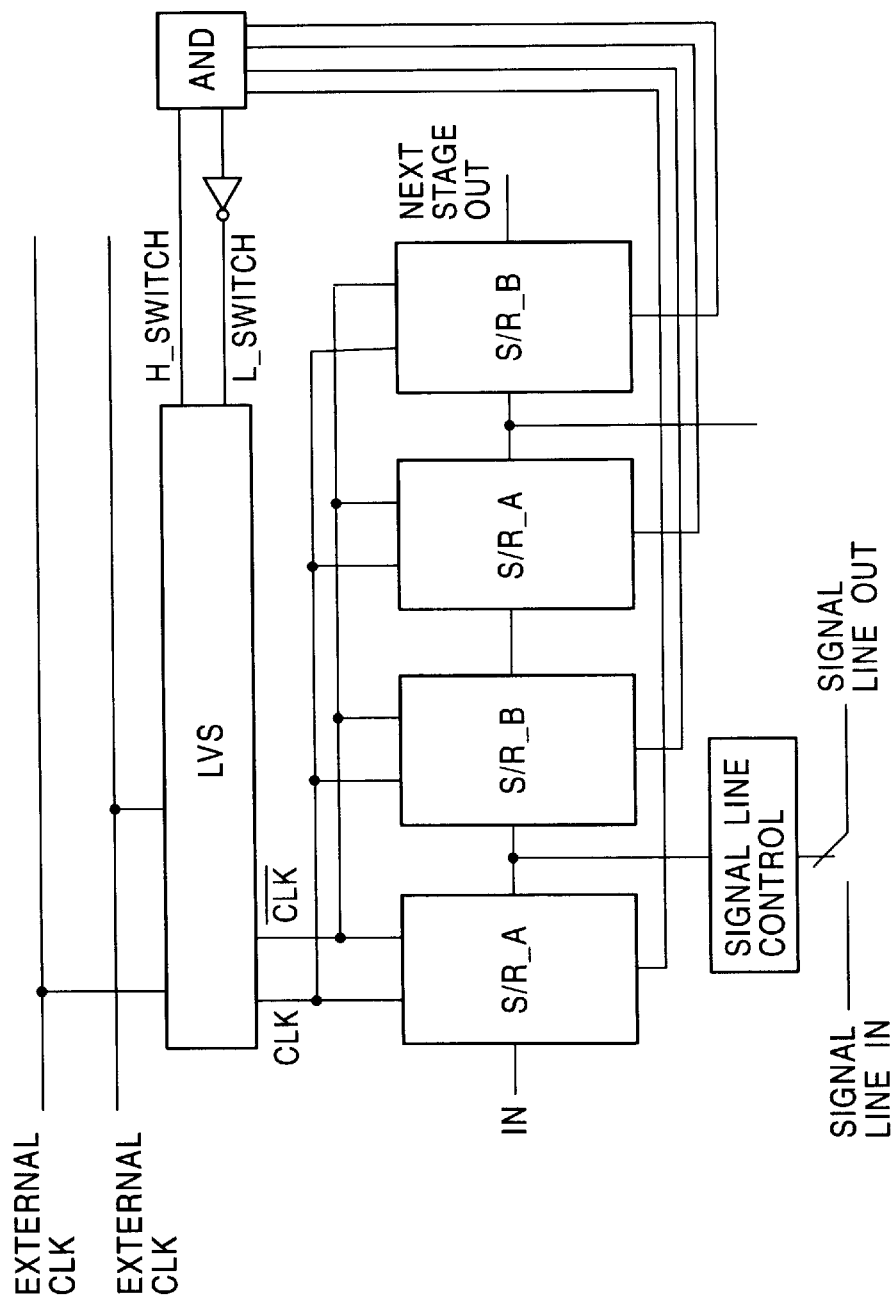
FIG. 30 is a block diagram illustrating another comparative example of an active matrix circuit.

FIG. 30 is a block diagram illustrating a comparative example of a level shifter. In this example, a level shifter LVS is disposed immediately before shift registers S/R_A, S/R_B, . . . , . and they are connected such that the level shifter LVS is controlled by the outputs of the respective shift registers via an AND gate. In this configuration, because as many output lines are connected to the AND gate as the shift register has many stages connected to the level shifter, the interconnections occupy a large area, which reduces the circuit area.

Figure 31:
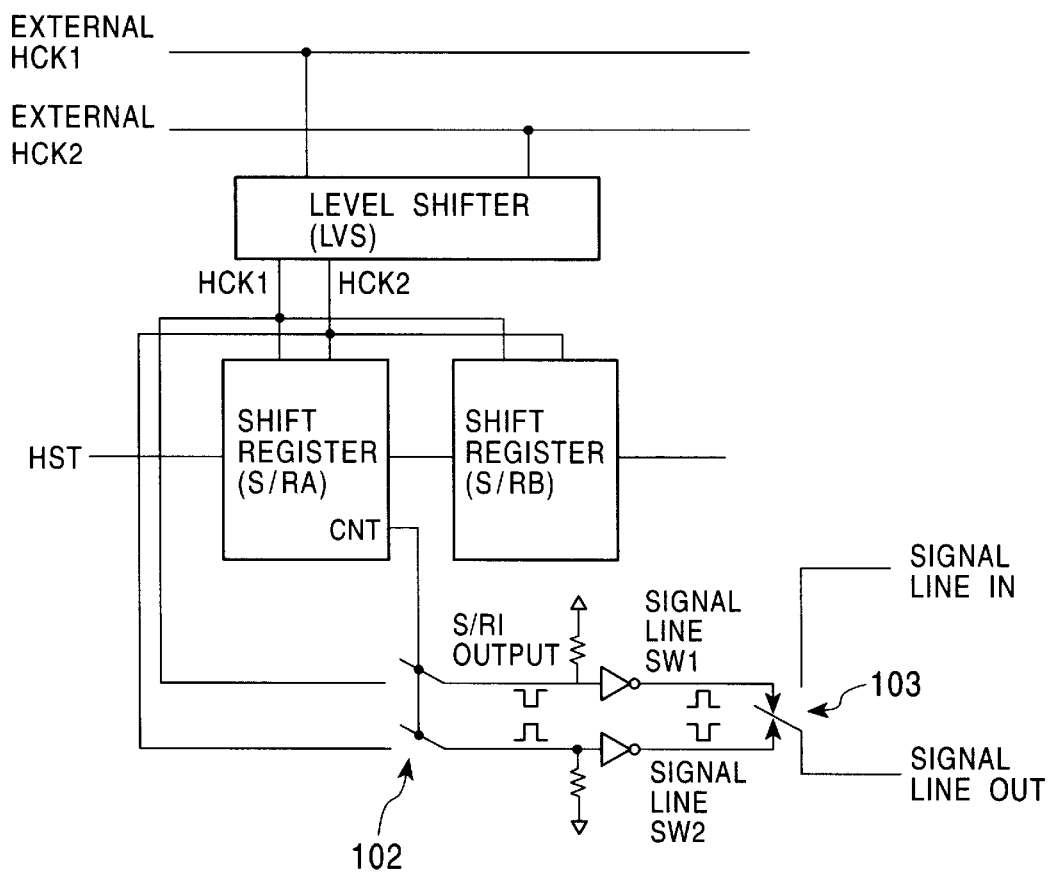
FIG. 31 is a block diagram illustrating a seventh embodiment of the present invention.

FIG. 31 is a block diagram illustrating an embodiment of an active matrix circuit according to the seventh aspect of the present invention. As shown in FIG. 31, this circuit includes a voltage multiplying circuit for stepping up a low-voltage clock signals HCK1 and HCK2 input from the outside and supplying resultant high-voltage clock signals to the respective stages of a transfer circuit (shift registers S/R_A and S/R_B). The voltage multiplying circuit includes a plurality of level shifters for individually stepping up clock signals HCK1 and HCK2 for the respective stages (S/R_A, S/R_B) of the transfer circuit. In response to clock signals HCK1 and HCK2 supplied from the corresponding level shifter LVS, each stage (S/R_A, S/R_B) of the transfer circuit performs a transfer operation and outputs a control pulse. The active matrix circuit also includes a switch 102 for sampling the clock signals HCK1 and HCK2 in response to the control pulse described above and controlling the on/off operation of the respective signal lines.

Figure 32:
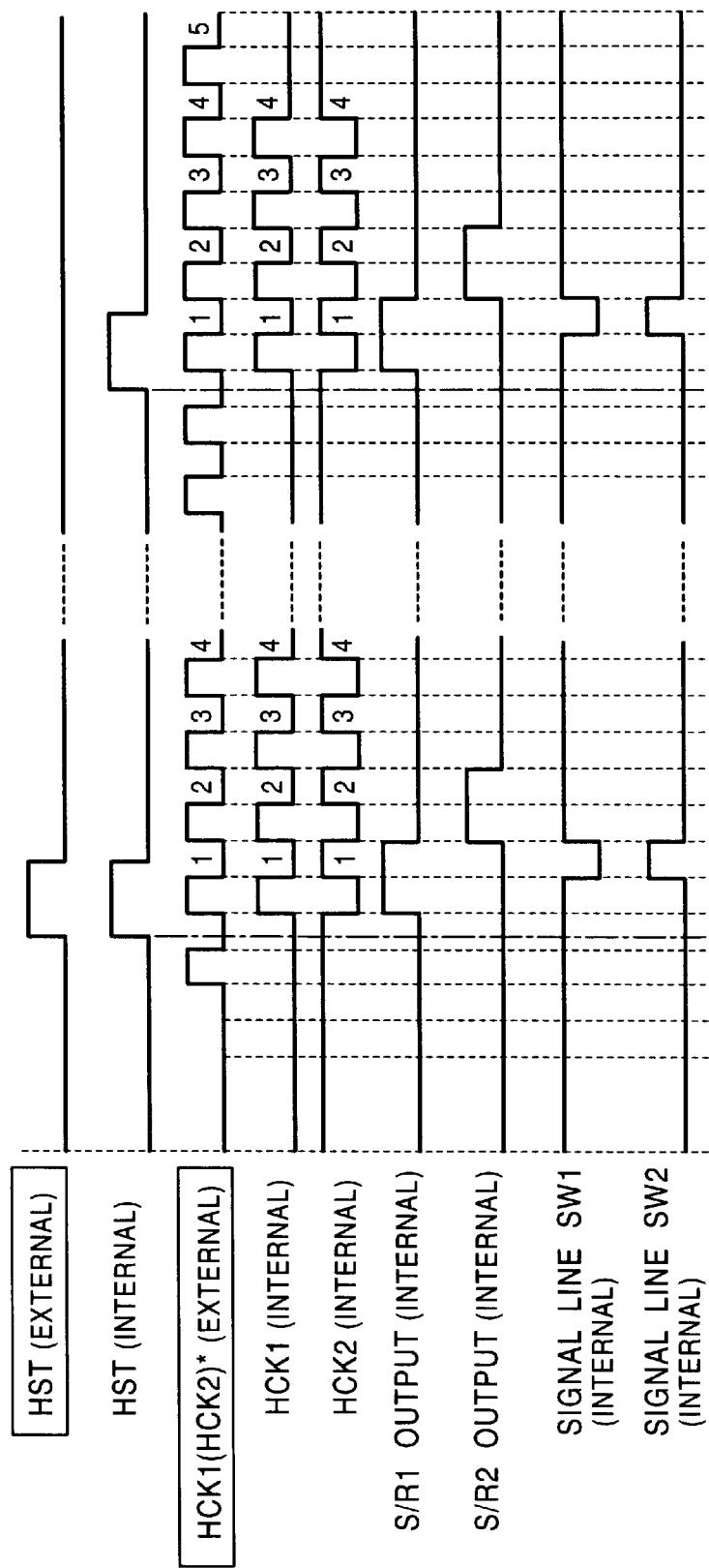
FIG. 32 is a timing chart illustrating the operation according to the seventh embodiment of the present invention.

FIG. 32 is a timing chart illustrating the operation of the circuit shown n FIG. 31. The operation of this active matrix circuit is described below with reference to FIG. 32 and FIG. 31. A transfer driving signal (HCK signal) for driving the transfer circuit (shift registers S/R_A and S/R_B) is input from the outside and its voltage is stepped up by the internal voltage multiplying circuit (level shifter). The stepped-up HCK signal is supplied as a latch signal to the shift register.

In the transfer operation, to obtain a signal for controlling the signal line control switch 103, the switch 102 of the HCK signal is closed in response to a signal output from the shift register. Because the signal for controlling the signal line switch is the same as the signal input as HCK, the signal input to the signal line control switch 103 is input exactly at a next transition of the signal (latch signal). When the transfer operation is completed, the switch 102 is closed by the switch control signal which is the same as HCK, and the voltages are fixed at DC levels. Herein, if the circuit employs a method in which the fixed voltages of the interconnection lines are fed back to control the output of the shift register, the circuit becomes unstable when the initial state includes uncertainty. Therefore, when such a method is employed, it is needed to again input the initial setting signal. When the voltages have been fixed, the signal line control switch 103 is turned off and the current state is held. During the transfer operation, each signal line is controlled by the corresponding switch 103. Herein, because the switch 103 is controlled by HCK, the timing of switching each signal line can be is controlled with high accuracy determined by the delay from the external signal, and thus there is a very small delay in the switching timing. Because HCK is latched with a timing produced by the transfer circuit (shift register), and the latched signal is applied to the switch to control it, the signal line can be controlled at a point of time with a small delay with respect to the external signal. That is, HCK serves both as a latch signal in the shift register and as a control signal for controlling the signal line control switch. Thus, the total number of circuits and the installation space can be reduced.

Figure 33:
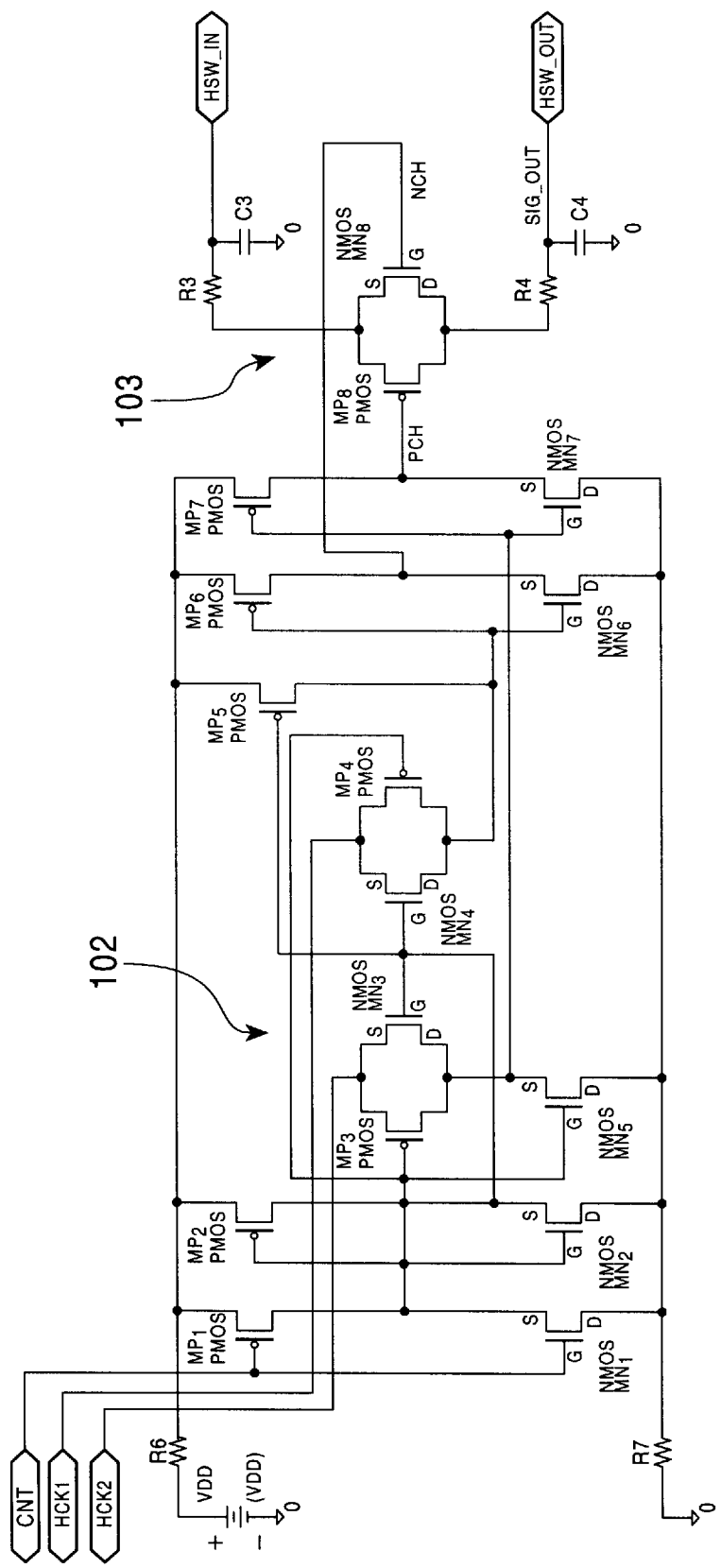
FIG. 33 is a circuit diagram illustrating a specific example of a circuit according to the seventh embodiment of the present invention.

FIG. 33 is a circuit diagram illustrating a specific example of a circuit configuration of the switch 102, the switch 103, and associated parts in the circuit shown in FIG. 32. HCK1 and HCK2 output from the level shifter is gated by the switch 103 which is controlled by a signal CNT output from the corresponding shift register. The gated signals HCK1 and HCK2 are applied to the switch 103 constructed into the form of a transmission gate to control the on/off operation associated with the corresponding signal line.

Preferably, thin film transistors are used as the active devices (switching devices) in the active matrix circuit described above. A thin semiconductor film serving as the active layer (device region) of each thin film transistor is formed of polycrystalline silicon. Polycrystalline silicon thin-film transistors are used not only as switching devices but also as circuit elements. That is, using polycrystalline silicon thin-film transistors, switching devices and peripheral driving circuits such as a scanning circuit and a voltage multiplying circuit can be formed on the same substrate. Because polycrystalline silicon thin-film transistors can be formed so as to have very small sizes, it is possible to reduce the area occupied by the switching devices in the active matrix structure, and high-precision pixels can be formed. Conventionally, polycrystalline silicon thin-film transistors are produced using a process including a high-temperature process at 1000° C. or the like. Therefore, it is needed to use an insulating substrate having high heat resistance, such as quartz glass. The high-temperature process included in the production process makes it difficult to employ a substrate made of glass having a low melting point. However, it is desirable to use a low-melting point glass material to reduce the cost of the active matrix circuit. To meet the above requirement, efforts are currently being made to develop a low-temperature process in which a maximum processing temperature is lower than 600° C. In particular, low-temperature processes are very useful in cost when high-precision active matrix apparatuses are produced.

FIG. 34 illustrates an example of a process of producing a thin film transistor used in the active matrix circuit according to the present invention. Although only a low-temperature process for producing an n-channel thin-film transistor is described herein, a p-channel thin-film transistor can also be produced in a similar manner except that the impurities (dopants) should be of types corresponding to the p-channel. Herein, by way of example, a method of producing a thin film transistor with a bottom gate structure is described. First, as shown in FIG. 34A, a film of Al, Ta, Mo, W, Cr, or Cu, or an alloy of a combination of these metals with a thickness of 100 to 250 nm is formed on an insulating substrate 1 made of glass or the like, and the film is patterned into the shape of a gate electrode 6.

Figure 34A:
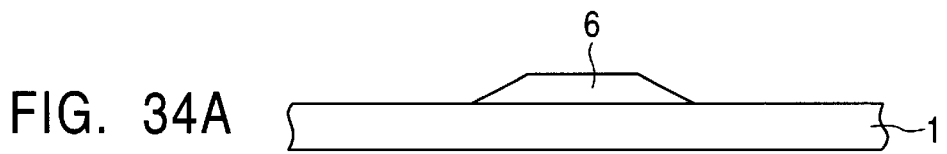
FIG. 34, consisting of FIGS. 34A to 34D, is a diagram illustrating a process of producing a thin film transistor used in an active matrix circuit according to the present invention.
Figure 34B:
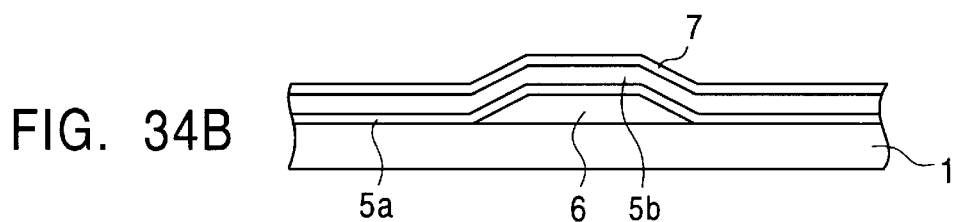

After that, a gate insulating film is formed such that the gate electrode 6 is covered with the gate insulating film as shown in FIG. 34B. In the present embodiment, a two-layer film consisting of a gate nitride layer 5a (SiN$_x$) and a gate oxide layer 5b (SiO$_2$) is employed as the gate insulating film. The gate nitride layer 5a may be formed by means of plasma CVD (PCVD) using a mixture of SiH$_4$ gas and NH$_3$ gas as a source gas. Atmospheric-pressure CVD or low-pressure CVD may be employed instead of plasma CVD. In this specific embodiment, the gate nitride layer 5a has a thickness of 50 nm. After forming the gate nitride layer 5a, the gate oxide layer 5b is formed so as to have a thickness of about 200 nm. Thereafter, a thin semiconductor film 7 of noncrystalline silicon with a thickness of 30 to 80 nm is formed on the gate oxide film 5b. The two-layer gate insulating film and the thin noncrystalline silicon film 7 are continuously formed in a deposition chamber maintained in a high vacuum. In the case where plasma CVD is used, annealing for desorption of hydrogen from the deposited film is performed in a nitrogen ambient at 400 to 450° C. for 1 to 2 hours.

Thereafter, ion implantation is performed as required to control the threshold voltage of the thin-film transistor. In this specific embodiment, a dose of $1 \times 10^{12}$ to $6 \times 10^{12}$ cm$^{-2}$ of B$^+$ is implanted. Thereafter, the noncrystalline semiconductor thin-film 7 is irradiated with a laser beam so as to crystallize it. An excimer laser beam may be employed as the laser beam. Laser annealing is a useful process to crystallize a thin semiconductor film at a low temperature below 600° C. In the present embodiment, crystallization is performed by irradiating the noncrystalline semiconductor thin-film 7 with a rectangular- or band-shaped pulse laser beam. Because desorption of hydrogen has been performed in the previous step, quick heating of the noncrystalline semiconductor thin-film 7 by means of irradiation with the laser beam does not cause bumping of hydrogen. Instead of the crystallization by means of laser irradiation, the thin semiconductor film may be crystallized by means of solid growth. Also in this case, to obtain a polycrystalline semiconductor thin-film with high crystal quality including a low density of defects, it is important to perform hydrogen desorption beforehand. Thereafter, the thin semiconductor film 7 is patterned to form device regions of the respective thin film transistors.

Figure 34C:
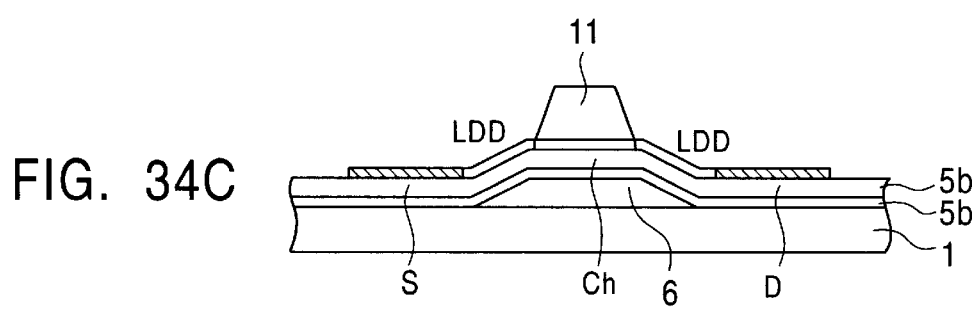

After that, as shown in FIG. 34(C), SiO$_2$ with a thickness of 100 nm to 300 nm is then formed by means of plasma CVD or the like on the polycrystalline semiconductor thin-film 7 crystallized in the previous step. In the present embodiment, SiO$_2$ may be formed by means of decomposition of silane gas. The SiO$_2$ film is then patterned into a desired shape so as to serve as a stopper film 11. Herein, the patterning of the SiO$_2$ film into the stopper film 11 may be performed using a back-side exposure technique so that the resultant stopper film 11 is aligned with respect to the gate electrode 6. A part of the polycrystalline semiconductor thin-film 7 just under the stopper film 11 is protected as a channel region CH by the stopper film 11. Thereafter, an impurity (for example P$^+$ ions) is doped by means of ion implantation into the thin semiconductor film 7 using the stopper film 11 as a mask so as to form LDD regions. The dose of the impurity may be selected, for example, within the range from $4\times10^{12}$ to $5\times10^{13}$ cm$^2$. The acceleration voltage in the ion implantation may be set to, for example, 10 KeV. A photoresist pattern is then formed such that the stopper film 11 and the LDD regions at the respective sides of the stopper film 11 are covered with the photoresist pattern, and a high-concentration of impurity (P$^+$, for example) is doped using the photoresist pattern as a mask to form a source region S and a drain region D. Herein, the impurity doping may be performed, for example, using an ion doping (ion shower) technique. In this technique, the impurity is implanted by means of acceleration by an electric field without performing mass separation. In this specific embodiment, the impurity is implanted to a dose of about $1\times10^{15}$ cm$^2$ using PH$_3$ gas diluted with H$_2$ to form the source region S and the drain region D. Although not shown in the figure, when a p-channel thin-film transistor is formed, ion doping is performed using B$^+$ ions instead of P$^+$ to a dose of about $1\times10^{15}$ cm$^2$ after covering the n-channel thin-film transistor region with photoresist. In this case, for example, B$_2$H$_6$ gas diluted with H$_2$ may be used. In the impurity doping described above, ion implantation using an ion implanter with an ion separator may be employed instead of the ion doping. The impurity implanted into the thin semiconductor film 7 is then activated. The activation may be performed by means of furnace annealing, laser beam annealing, or RTA annealing.

Figure 34D:
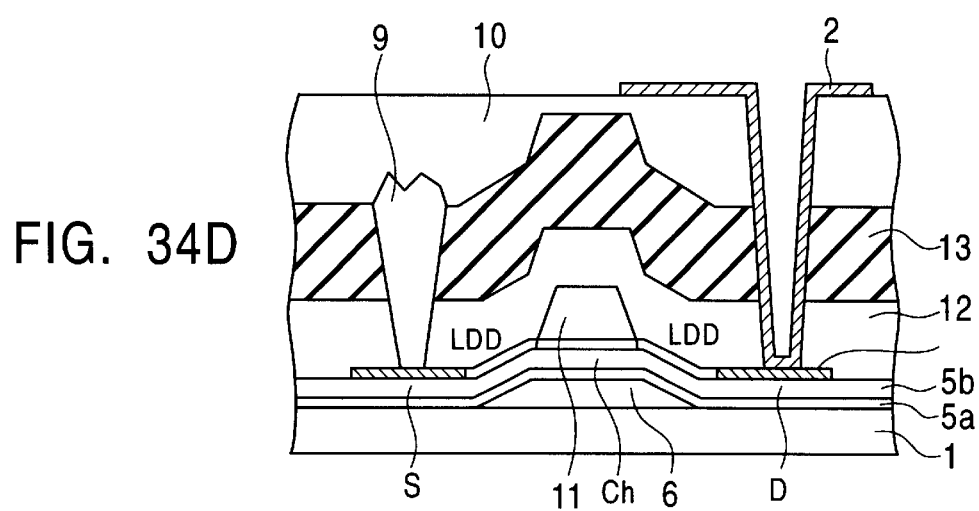

Finally, as shown in FIG. 34(D), SiO$_2$ with a thickness of about 200 nm is deposited to form an interlayer insulating film 12. After forming the interlayer insulating film 12, SiN$_x$ with a thickness of about 200 to 400 nm is deposited by means of CVD to form a passivation film (cap film) 13. Thereafter, heat treatment is performed in an ambient of nitrogen gas or forming gas or in a vacuum ambient at about 350° C. for one hour to diffuse hydrogen atoms contained in the interlayer insulating film 12 into the thin semiconductor film 7. A contact hole is then formed. Thereafter, metal such as Mo or Al is sputtered to a thickness of 200 to 400 nm and patterned into a desired shape to form an interconnection electrode 9. Furthermore, acryl resin or the like is coated to a thickness of about 1 μm to form a planarization layer 10. A contact hole is then formed. Thereafter, ITO or IXO is sputtered to form a transparent conductive film on the planarization layer 10 and is patterned into a desired shape to form an electrode 2. In the case where ITO is used, annealing is performed in an ambient of N$_2$ at 220° C. for about 30 min.

As described above, in the dot-to-dot transfer circuit according to the first aspect of the present invention, it is not needed to always input a transfer start signal (VST signal) from the outside and thus there is no need to provide an external circuit for always inputting the transfer start signal. This allows a reduction in the total number of circuits used in the system. Furthermore, because the transfer start signal is needed to be input only when the transfer operation is started, the power consumed by the internal level shifter and the external system can be reduced. Because it is not needed to always input the transfer start signal (VST) from the outside, influence of noise contained in the input signal is minimized. The delays of the transfer start signal (VST) and the driving signal (VCK) can be handled and a large operation margin is obtained. This technique may also be applied to a signal used only for initial setting of the driving mode or the like. When this transfer circuit is used in a device in which data is input or output to or from internal dots with a fixed period, no external control signal is needed. Thus, this transfer circuit is very useful when it is employed in such a device.

In the dot-to-dot transfer circuit according to the second aspect of the present invention, as described above, VCK and VST are internally generated without needing an external signal. It is not needed to provide an external circuit for externally supplying VCK, and thus the total number of circuits used in the system can be reduced. Because it is not needed to input VCK from the outside, there is no influence of noise from the outside. The signal is latched at a proper point of time determined by a logic circuit taking into account the delays of VST and VCK, the operation does not greatly depend upon the input waveform, and a large operation margin is obtained.

In the horizontal transfer circuit according to the third aspect of the present invention, as described above, it is not needed to always input the transfer start signal from the outside, and thus it is not needed to provided an external circuit for always inputting the transfer start signal. As a result, the total number of circuits used in the system can be reduced. Because the external signal is input only when the transfer operation is started, the power consumed by the internal level shifts and by the external system can be reduced. Because it is not needed to always input the start signal from the outside, influence of noise contained in the input signal is minimized. When the external signal is unnecessary, it is blocked. The delays of the start signal and the driving signal can be handled and a large operation margin is obtained. This technique may also be applied to a signal which is periodically generated after performing initial setting as to the driving mode or the like. A technique of generating a signal from a reference clock is employed, it is possible to periodically generate a signal from an internal signal using a loop circuit.

In the dot-to-dot transfer circuit according to the fourth aspect of the present invention, as described above, the initialization of the circuit can be performed without needing to perform a transfer operation for sweeping out invalid data. Therefore, it is possible to immediately initialize the transfer state at any desired point of time. That is, it is possible to reset uncertain voltages in the transfer circuit, which depend upon the previous operation state, into the initial certain values at any desired time at which data is to be input or output. This prevents an abnormal operation from occurring when the transfer operation is started. It is not needed to perform a dummy transfer operation when power is turned on or when the transfer operation is started. Therefore, the operation can be performed without needing a large margin in terms of the timing period or the like. It is possible to input or output data into or from the device immediately after inputting the initialization signal.

According to the fifth aspect of the invention, as described above, the variation in the duty ratio due to the variations in the characteristics of the transistor in the buffer is small compared with the case in which a level shifter including a multi-stage buffer is disposed at an end of a circuit and the buffer of the level shifter is designed to drive the maximum interconnection load. No waveform shaping circuit for compensating for the variation in the duty ratio is needed. A small buffer for driving the load can be employed in the level shifter and thus the power consumption of the buffer can be minimized. When no transfer operation is performed, the load becomes small and less amount of power is consumed by the level shifter. The delay and the reduction in the voltage amplitude are small. Therefore, it is possible to drive the shift register with a large margin. Because one level shifter is provided for each stage of a shift register, it becomes unnecessary to add dummy stages to the first and final stages of the shift register. Therefore, the circuit area can be reduced by an amount corresponding to the circuit area for the dummy stages and the number of circuit elements can be reduced. Power consumption can also be reduced. Because each level shifter is activated by the shift register itself, the overlapping period between adjacent level shifters can be minimized and thus the power consumed by the level shifters can be reduced.

According to the sixth aspect of the invention, as described above, the variation in the duty ratio due to the variations in the characteristics of the transistor in the buffer is small compared with the case in which a level shifter including a multi-stage buffer is disposed at an end of a circuit and the buffer of the level shifter is designed to drive the maximum interconnection load. No waveform shaping circuit for compensating for the variation in the duty ratio is needed. A small buffer for driving the load can be employed in the level shifter and thus the power consumption of the buffer can be minimized. When no transfer operation is performed, the load becomes small and less amount of power is consumed by the level shifter. The delays and the amplitude reductions due to the loads at the first and final stages are small. Thus, it is possible to drive the shift register with a large operation margin. Furthermore, compared with the case in which one level shifter is provided for one stage of the shift register, the number of control signal lines can be reduced and thus area occupied by the control signal lines can be reduced. Therefore, it becomes possible to use a greater area to dispose circuit elements and supply a large enough current. Because each level shifter is activated by the shift register itself, the overlapping period between adjacent level shifters can be minimized and thus the power consumed by the level shifters can be reduced.

In the active matrix circuit according to the seventh aspect of the present invention, as described above, because the signal lines connected to the respective dots are controlled in response to the reference clock (HCK), the influence of the internal delay which occurs in the transfer circuit can be minimized, and the timing of transfer operation can be controlled with high accuracy determined by the delay from the external signal, and thus it is possible to control the operation timing with a very small total delay. Because the latching operation of the shift register and the switching of the signal lines can be controlled by the same control signal, the number of circuit elements and the total size of the circuit can be reduced. Furthermore the power consumption can also be reduced. Because the delays of HST and HCK are small enough, the circuit has a large operation margin.

What is claimed is:

1. An active matrix circuit comprising selection lines extending along rows, signal lines extending along columns, active devices disposed at respective locations where said selection lines and said signal lines cross each other, a vertical scanning circuit for outputting selection pulse to sequentially scan said selection lines thereby selecting active device, and a horizontal scanning circuit for outputting control pulse to open or close the respective signal lines thereby inputting or outputting a signal to selected active device,
   wherein said vertical scanning circuit includes a transfer circuit for transferring an input start pulse from a first stage to a final stage in a stage-by-stage fashion in response to a clock signal thereby generating a selection pulse, and also includes a start pulse generating circuit which internally generates a start pulse by processing a selection pulse output from the final stage of said transfer circuit and applies the resultant start pulse to the first stage of said transfer circuit, and
   wherein said active matrix circuit further comprises a voltage multiplying circuit including a level shifter for stepping up the clock signal to respective stages of the transfer circuit.

2. An active matrix circuit according to claim 1, wherein each said active device is a thin film transistor including a device region of polysilicon formed on an insulating substrate.

3. An active matrix circuit comprising selection lines extending along rows, signal lines extending along columns, active devices disposed at respective locations where said selection lines and said signal lines cross each other, a vertical scanning circuit for outputting selection pulses to sequentially scan said selection lines thereby selecting active devices, and a horizontal scanning circuit for outputting control pulses to open or close the respective signal lines thereby inputting or outputting a signal to selected active devices,
   wherein said horizontal scanning circuit includes a horizontal transfer circuit for transferring a horizontal start pulse from a first stage to a final stage in a stage-by-stage fashion in response to a horizontal clock signal thereby outputting a control pulse; and
   said vertical scanning circuit includes a vertical transfer circuit for transferring a vertical start pulse from a first stage to a final stage in a stage-by-stage fashion in response to a vertical clock signal and also includes a vertical clock signal generator which generates a vertical clock signal by processing a control pulse output from the final stage of said horizontal transfer circuit and supplies the resultant vertical clock signal to said vertical transfer circuit, and
   wherein said active matrix circuit further comprises a voltage multiplying circuit including a level shifter for stepping up the horizontal and vertical clock signals to respective stages of the horizontal and vertical transfer circuits.

4. An active matrix circuit according to claim 3, wherein each said active device is a thin film transistor including a device region of polysilicon formed on an insulating substrate.

5. An active matrix circuit comprising selection lines extending along rows, signal lines extending along columns, active devices disposed at respective locations where said selection lines and said signal lines cross each other, a vertical scanning circuit for outputting selection pulses to sequentially scan said selection lines thereby selecting active devices, and a horizontal scanning circuit for outputting control pulses to open or close the respective signal lines thereby inputting or outputting a signal to selected active devices,
   wherein said horizontal scanning circuit includes a transfer circuit for transferring an input start pulse from a first stage to a final stage in a stage-by-stage fashion in response to a clock signal thereby generating a control pulse, and also includes a start pulse generating circuit which internally generates a start pulse by processing a control pulse output from the final stage of said transfer circuit and applies the resultant start pulse to the first stage of said transfer circuit, and wherein said active matrix circuit further comprises a voltage multiplying circuit including a level shifter for stepping up the clock signal to respective stages of the transfer circuit.

6. An active matrix circuit according to claim 5, wherein each said active device is a thin film transistor including a device region of polysilicon formed on an insulating substrate.

7. An active matrix circuit comprising selection lines extending along rows, signal lines extending along columns, active devices disposed at respective locations where said selection lines and said signal lines cross each other, a vertical scanning circuit for outputting selection pulses to sequentially scan said selection lines thereby selecting active devices, and a horizontal scanning circuit for outputting control pulses to open or close the respective signal lines thereby inputting or outputting a signal to selected active devices, wherein said horizontal scanning circuit includes a horizontal transfer circuit for transferring a horizontal start pulse from a first stage to a final stage in a stage-by-stage fashion in response to a horizontal clock signal thereby outputting a control pulse;

said vertical scanning circuit includes a vertical transfer circuit for transferring a vertical start pulse from a first stage to a final stage in a stage-by-stage fashion in response to a vertical clock signal; and said active matrix circuit further comprises a reset circuit for, in response to a reset pulse supplied from the outside, forcedly resetting said horizontal transfer circuit and said vertical transfer circuit into their initial states, and wherein said active matrix circuit further comprises a voltage multiplying circuit including a level shifter for stepping up the vertical clock signal to respective stages of the vertical transfer circuit.

8. An active matrix circuit according to claim 7, wherein each said active device is a thin film transistor including a device region of polysilicon formed on an insulating substrate.

9. An active matrix circuit comprising selection lines extending along rows, signal lines extending along columns, active devices disposed at respective locations where said selection lines and said signal lines cross each other, a vertical scanning circuit for outputting selection pulses to sequentially scan said selection lines thereby selecting active devices, and a horizontal scanning circuit for outputting control pulses to open or close the respective signal lines thereby inputting or outputting a signal to selected active devices, said horizontal scanning circuit including a first horizontal transfer circuit for transferring a first start pulse from a first stage to a final stage in a stage-by-stage fashion in response to a first clock signal thereby outputting a control pulse, said vertical scanning circuit including a second horizontal transfer circuit for transferring a second start pulse from a first stage to a final stage in a stage-by-stage fashion in response to a second clock signal, wherein said active matrix circuit further comprises a voltage multiplying circuit for stepping up a low-voltage clock signal input from the outside and supplying a resultant high-voltage clock signal to respective stages of the transfer circuits, said voltage multiplying circuit including a plurality of level shifters for individually stepping up clock signals for the respective stages of said transfer circuit.

10. An active matrix circuit according to claim 9, wherein each said active device is a thin film transistor including a device region of polysilicon formed on an insulating substrate.

11. An active matrix circuit according to claim 9, wherein each level shifter performs a stepping-up operation in synchronization with the transferring operation of the corresponding stage of the transfer circuits.

12. An active matrix circuit according to claim 11, wherein the on-off transition of the voltage multiplying operation of each level shifter is directly controlled by a pulse output from a corresponding stage of the transfer circuits.

13. An active matrix circuit comprising selection lines extending along rows, signal lines extending along columns, active devices disposed at respective locations where said selection lines and said signal lines cross each other, a vertical scanning circuit for outputting selection pulses to sequentially scan said selection lines thereby selecting active devices, and a horizontal scanning circuit for outputting control pulses to open or close the respective signal lines thereby inputting or outputting a signal to selected active devices, said horizontal scanning circuit including a first horizontal transfer circuit for transferring a first start pulse from a first stage to a final stage in a stage-by-stage fashion in response to a first clock signal thereby outputting a control pulse, said vertical scanning circuit including a second horizontal transfer circuit for transferring a second start pulse from a first stage to a final stage in a stage-by-stage fashion in response to a second clock signal, wherein said active matrix circuit further comprises a voltage multiplying circuit for stepping up a low-voltage clock signal input from the outside and supplying a resultant high-voltage clock signal to respective stages of the transfer circuits, said voltage multiplying circuit including level shifters for individually stepping up a clock signal for respective sets of two or more stages of said transfer circuits.

14. An active matrix circuit according to claim 13, wherein each said active device is a thin film transistor including a device region of polysilicon formed on an insulating substrate.

15. An active matrix circuit according to claim 13, wherein each level shifter performs a stepping-up operation in synchronization with the transferring operation of a corresponding set of two or more stages of the transfer circuits.

16. An active matrix circuit comprising selection lines extending along rows, signal lines extending along columns, active devices disposed at respective locations where said selection lines and said signal lines cross each other, a vertical scanning circuit for outputting selection pulses to sequentially scan said selection lines thereby selecting active devices, and a horizontal scanning circuit for outputting control pulses to open or close the respective signal lines thereby inputting or outputting a signal to selected active devices, said horizontal scanning circuit including a transfer circuit for transferring a start pulse from a first stage to a final stage in a stage-by-stage fashion in response to a clock signal thereby outputting a control pulse, wherein said active matrix circuit further comprises a voltage multiplying circuit for stepping up a low-voltage clock signal input from the outside and supplying a resultant high-voltage clock signal to respective stages of said transfer circuit, said voltage multiplying circuit includes a plurality of level shifters for separately stepping up clock signals for the respective stages of said transfer circuit, each stage of said transfer circuit performs a transferring operation in response to a clock signal supplied from a corresponding level shifter thereby outputting a control pulse, and said active matrix circuit further comprises a switch for sampling the clock signal in response to the control pulse and controlling the on/off operation associated with the respective signal lines.

17. An active matrix circuit according to claim 16, wherein each said active device is a thin film transistor including a device region of polysilicon formed on an insulating substrate.

18. A surface pressure distribution detecting apparatus comprising selection lines extending along rows, signal lines extending along columns, active devices disposed at respective locations where said selection lines and said signal lines cross each other, electrodes connected to said respective active devices and serving to receive a signal corresponding to a surface pressure applied from the outside, a vertical scanning circuit for outputting selection pulses to sequentially scan said selection lines thereby selecting active devices, and a horizontal scanning circuit for outputting control pulses to open or close the respective signal lines thereby inputting or outputting a signal to selected active devices, wherein said vertical scanning circuit includes a transfer circuit for transferring an input start pulse from a first stage to a final stage in a stage-by-stage fashion in response to a clock signal thereby generating a selection pulse, and also includes a start pulse generating circuit which internally generates a start pulse by processing a selection pulse output from the final stage of said transfer circuit and applies the resultant start pulse to the first stage of said transfer circuit, and wherein said surface pressure distribution detecting apparatus further comprises a voltage multiplying circuit including a level shifter for stepping up the clock signal to respective stages of the transfer circuit.

19. A surface pressure distribution detecting apparatus according to claim 18, wherein each said active device is a thin film transistor including a device region of polysilicon formed on an insulating substrate.

20. A surface pressure distribution detecting apparatus comprising selection lines extending along rows, signal lines extending along columns, active devices disposed at respective locations where said selection lines and said signal lines cross each other, electrodes connected to said respective active devices and serving to receive a signal corresponding to a surface pressure applied from the outside, a vertical scanning circuit for outputting selection pulses to sequentially scan said selection lines thereby selecting active devices, and a horizontal scanning circuit for outputting control pulses to open or close the respective signal lines thereby inputting or outputting a signal to selected active devices, wherein said horizontal scanning circuit includes a horizontal transfer circuit for transferring a horizontal start pulse from a first stage to a final stage in a stage-by-stage fashion in response to a horizontal clock signal thereby outputting a control pulse; and said vertical scanning circuit includes a vertical transfer circuit for transferring a vertical start pulse from a first stage to a final stage in a stage-by-stage fashion in response to a vertical clock signal and also includes a vertical clock signal generator which generates a vertical clock signal by processing a control pulse output from the final stage of said horizontal transfer circuit and supplies the resultant vertical clock signal to said vertical transfer circuit, and wherein said surface pressure distribution detecting apparatus further comprises a voltage multiplying circuit including a level shifter for stepping up the horizontal and vertical clock signals to respective stages of the horizontal and vertical transfer circuits.

21. A surface pressure distribution detecting apparatus according to claim 20, wherein each said active device is a thin film transistor including a device region of polysilicon formed on an insulating substrate.

22. A surface pressure distribution detecting apparatus comprising selection lines extending along rows, signal lines extending along columns, active devices disposed at respective locations where said selection lines and said signal lines cross each other, electrodes connected to said respective active devices and serving to receive a signal corresponding to a surface pressure applied from the outside, a vertical scanning circuit for outputting selection pulses to sequentially scan said selection lines thereby selecting active devices, and a horizontal scanning circuit for outputting control pulses to open or close the respective signal lines thereby inputting or outputting a signal to selected active devices, wherein said horizontal scanning circuit includes a transfer circuit for transferring an input start pulse from a first stage to a final stage in a stage-by-stage fashion in response to a clock signal thereby generating a control pulse, and also includes a start pulse generating circuit which internally generates a start pulse by processing a control pulse output from the final stage of said transfer circuit and applies the resultant start pulse to the first stage of said transfer circuit, and wherein said surface pressure distribution detecting apparatus further comprises a voltage multiplying circuit including a level shifter for stepping up the clock signal to respective stages of the transfer circuit.

23. A surface pressure distribution detecting apparatus according to claim 22, wherein each said active device is a thin film transistor including a device region of polysilicon formed on an insulating substrate.

24. A surface pressure distribution detecting apparatus comprising selection lines extending along rows, signal lines extending along columns, active devices disposed at respective locations where said selection lines and said signal lines cross each other, electrodes connected to said respective active devices and serving to receive a signal corresponding to a surface pressure applied from the outside, a vertical scanning circuit for outputting selection pulses to sequentially scan said selection lines thereby selecting active devices, and a horizontal scanning circuit for outputting control pulses to open or close the respective signal lines thereby inputting or outputting a signal to selected active devices, wherein said horizontal scanning circuit includes a horizontal transfer circuit for transferring a horizontal start pulse from a first stage to a final stage in a stage-by-stage fashion in response to a horizontal clock signal thereby outputting a control pulse;

said vertical scanning circuit includes a vertical transfer circuit for transferring a vertical start pulse from a first stage to a final stage in a stage-by-stage fashion in response to a vertical clock signal; and said surface pressure distribution detecting apparatus further comprises a reset circuit for, in response to a reset pulse supplied from the outside, forcedly resetting said horizontal transfer circuit and said vertical transfer circuit into their initial states, and wherein said surface pressure distribution detecting apparatus further comprises a voltage multiplying circuit including a level shifter for stepping up the horizontal and vertical clock signals to respective stages of the horizontal and vertical transfer circuits.

25. A surface pressure distribution detecting apparatus according to claim 24, wherein each said active device is a thin film transistor including a device region of polysilicon formed on an insulating substrate.

26. A surface pressure distribution detecting apparatus comprising selection lines extending along rows, signal lines extending along columns, active devices disposed at respective locations where said selection lines and said signal lines cross each other, electrodes connected to said respective active devices and serving to receive a signal corresponding to a surface pressure applied from the outside, a vertical scanning circuit for outputting selection pulses to sequentially scan said selection lines thereby selecting active devices, and a horizontal scanning circuit for outputting control pulses to open or close the respective signal lines thereby inputting or outputting a signal to selected active devices, said horizontal scanning circuit including a first horizontal transfer circuit for transferring a first start pulse from a first stage to a final stage in a stage-by-stage fashion in response to a first clock signal thereby outputting a control pulse, said vertical scanning circuit including a second horizontal transfer circuit for transferring a second start pulse from a first stage to a final stage in a stage-by-stage fashion in response to a second clock signal, wherein said surface pressure distribution detecting apparatus further comprises an active matrix circuit including a voltage multiplying circuit for stepping up a low-voltage clock signal input from the outside and supplying a resultant high-voltage clock signal to respective stages of the transfer circuits, said voltage multiplying circuit including a plurality of level shifters for individually stepping up clock signals for the respective stages of said transfer circuit.

27. A surface pressure distribution detecting apparatus according to claim 26, wherein each said active device is a thin film transistor including a device region of polysilicon formed on an insulating substrate.

28. A surface pressure distribution detecting apparatus according to claim 26, wherein each level shifter performs a stepping-up operation in synchronization with the transferring operation of the corresponding stage of the transfer circuits.

29. A surface pressure distribution detecting apparatus according to claim 28, wherein the on-off transition of the voltage multiplying operation of each level shifter is directly controlled by a pulse output from a corresponding stage of the transfer circuits.

30. A surface pressure distribution detecting apparatus comprising selection lines extending along rows, signal lines extending along columns, active devices disposed at respective locations where said selection lines and said signal lines cross each other, electrodes connected to said respective active devices and serving to receive a signal corresponding to a surface pressure applied from the outside, a vertical scanning circuit for outputting selection pulses to sequentially scan said selection lines thereby selecting active devices, and a horizontal scanning circuit for outputting control pulses to open or close the respective signal lines thereby inputting or outputting a signal to selected active devices, said horizontal scanning circuit including a first horizontal transfer circuit for transferring a first start pulse from a first stage to a final stage in a stage-by-stage fashion in response to a first clock signal thereby outputting a control pulse, said vertical scanning circuit including a second horizontal transfer circuit for transferring a second start pulse from a first stage to a final stage in a stage-by-stage fashion in response to a second clock signal, wherein said surface pressure distribution detecting apparatus further comprises an active matrix circuit including a voltage multiplying circuit for stepping up a low-voltage clock signal input from the outside and supplying a resultant high-voltage clock signal to respective stages of the transfer circuits, said voltage multiplying circuit including level shifters for individually stepping up a clock signal for respective sets of two or more stages of said transfer circuits.

31. A surface pressure distribution detecting apparatus according to claim 30, wherein each said active device is a thin film transistor including a device region of polysilicon formed on an insulating substrate.

32. A surface pressure distribution detecting apparatus according to claim 30, wherein each level shifter performs a stepping-up operation in synchronization with the transferring operation of a corresponding set of two or more stages of the transfer circuits.

33. A surface pressure distribution detecting apparatus comprising selection lines extending along rows, signal lines extending along columns, active devices disposed at respective locations where said selection lines and said signal lines cross each other, electrodes connected to said respective active devices and serving to receive a signal corresponding to a surface pressure applied from the outside, a vertical scanning circuit for outputting selection pulses to sequentially scan said selection lines thereby selecting active devices, and a horizontal scanning circuit for outputting control pulses to open or close the respective signal lines thereby inputting or outputting a signal to selected active devices, said horizontal scanning circuit including a transfer circuit for transferring a start pulse from a first stage to a final stage in a stage-by-stage fashion in response to a clock signal thereby outputting a control pulse, wherein said surface pressure distribution detecting apparatus further comprises an active matrix circuit including a voltage multiplying circuit for stepping up a low-voltage clock signal input from the outside and supplying a resultant high-voltage clock signal to respective stages of said transfer circuit, said voltage multiplying circuit includes a plurality of level shifters for separately stepping up clock signals for the respective stages of said transfer circuit, each stage of said transfer circuit performs a transferring operation in response to a clock signal supplied from a corresponding level shifter thereby outputting a control pulse, and said active matrix circuit further comprises a switch for sampling the clock signal in response to the control pulse and controlling the on/off operation associated with the respective signal lines.

34. A surface pressure distribution detecting apparatus according to claim 33, wherein each said active device is a thin film transistor including a device region of polysilicon formed on an insulating substrate.

35. A method of driving an active matrix circuit comprising selection lines extending along rows, signal lines extending along columns, and active devices disposed at respective locations where said selection lines and said signal lines cross each other, said method comprising a vertical scanning step for outputting selection pulses to sequentially scan said selection lines thereby selecting active devices, and a horizontal scanning step for outputting control pulses to open or close the respective signal lines thereby inputting or outputting a signal to selected active devices, whereby said vertical scanning step includes a transfer step for transferring an input start pulse from a first stage to a final stage of a shift register in a stage-by-stage fashion in response to a clock signal thereby generating a selection pulse, and also includes a start pulse generating step in which a start pulse is internally generated by processing a selection pulse output from the final stage of said shift register and the resultant start pulse is applied to the first stage of said shift register, and a voltage multiplying step for stepping up the clock signal to respective stages of the shift register.

36. A method of driving an active matrix circuit, according to claim 35, wherein each said active device uses a thin film transistor including a device region of polysilicon formed on an insulating substrate.

37. A method of driving an active matrix circuit comprising selection lines extending along rows, signal lines extending along columns, and active devices disposed at respective locations where said selection lines and said signal lines cross each other, said method comprising a vertical scanning step for outputting selection pulses to sequentially scan said selection lines thereby selecting active devices, and a horizontal scanning step for outputting control pulses to open or close the respective signal lines thereby inputting or outputting a signal to selected active devices, whereby said horizontal scanning step includes a horizontal transfer step for transferring a horizontal start pulse from a first stage to a final stage of a horizontal shift register in a stage-by-stage fashion in response to a horizontal clock signal thereby outputting a control pulse; and said vertical scanning step includes a vertical transfer step for transferring a vertical start pulse from a first stage to a final stage of a vertical shift register in a stage-by-stage fashion in response to a vertical clock signal and also includes a vertical clock signal generating step in which a vertical clock signal is generated by processing a control pulse output from the final stage of said horizontal shift register and the resultant vertical clock signal is supplied to said vertical shift register, and a voltage multiplying step for stepping up the horizontal and vertical clock signals to respective stages of the horizontal and vertical shift registers.

38. A method of driving an active matrix circuit, according to claim 37, wherein each said active device uses a thin film transistor including a device region of polysilicon formed on an insulating substrate.

39. A method of driving an active matrix circuit comprising selection lines extending along rows, signal lines extending along columns, and active devices disposed at respective locations where said selection lines and said signal lines cross each other, said method comprising a vertical scanning step for outputting selection pulses to sequentially scan said selection lines thereby selecting active devices, and a horizontal scanning step for outputting control pulses to open or close the respective signal lines thereby inputting or outputting a signal to selected active devices, whereby said horizontal scanning step includes a transfer step for transferring an input start pulse from a first stage to a final stage of a shift register in a stage-by-stage fashion in response to a clock signal thereby generating a control and also includes a start pulse generating step in which a start pulse is internally generated by processing a control pulse output from the final stage of said shift register and the resultant start pulse is applied to the first stage of said shift register, and a voltage multiplying step for stepping up the clock signal to respective stages of the shift register.

40. A method of driving an active matrix circuit, according to claim 39, wherein each said active device uses a thin film transistor including a device region of polysilicon formed on an insulating substrate.

41. A method of driving an active matrix circuit comprising selection lines extending along rows, signal lines extending along columns, and active devices disposed at respective locations where said selection lines and said signal lines cross each other, said method comprising a vertical scanning step for outputting selection pulses to sequentially scan said selection lines thereby selecting active devices, and a horizontal scanning step for outputting control pulses to open or close the respective signal lines thereby inputting or outputting a signal to selected active devices, whereby said horizontal scanning step includes a horizontal transfer step for transferring a horizontal start pulse from a first stage to a final stage of a horizontal shift register in a stage-by-stage fashion in response to a horizontal clock signal thereby outputting a control pulse;

said vertical scanning step includes a vertical transfer step for transferring a vertical start pulse from a first stage to a final stage of a vertical shift register in a stage-by-stage fashion in response to a vertical clock signal; and said method further comprises a reset step for, in response to a reset pulse supplied from the outside, forcedly resetting said horizontal shift register and said vertical shift register into their initial states, and a voltage multiplying step for stepping up the horizontal and vertical clock signals to respective stages of the horizontal and vertical shift registers.

42. A method of driving an active matrix circuit, according to claim 41, wherein each said active device uses a thin film transistor including a device region of polysilicon formed on an insulating substrate.

43. A method of driving an active matrix circuit comprising selection lines extending along rows, signal lines extending along columns, and active devices disposed at respective locations where said selection lines and said signal lines cross each other, said method comprising a vertical scanning step for outputting selection pulses to sequentially scan said selection lines thereby selecting active devices, and a horizontal scanning step for outputting control pulses to open or close the respective signal lines thereby inputting or outputting a signal to selected active devices, said horizontal scanning circuit including a first horizontal transfer step for transferring a first start pulse from a first stage to a final stage of a first shift register in a stage-by-stage fashion in response to a first clock signal thereby outputting a control pulse, said vertical scanning step including a second horizontal transfer step for transferring a second start pulse from a first stage to a final stage of a second shift register in a stage-by-stage fashion in response to a second clock signal, wherein said method further comprises a voltage multiplying step for stepping up a low-voltage clock signal input from the outside and supplying a resultant high-voltage clock signal to respective stages of the shift registers, and wherein said voltage multiplying step uses a plurality of level shifters for individually stepping up clock signals for the respective stages of said shift registers.

44. A method of driving an active matrix circuit, according to claim 43, wherein each said active device uses a thin film transistor including a device region of polysilicon formed on an insulating substrate.

45. A method of driving an active matrix circuit, according to claim 43, wherein each level shifter performs a stepping-up operation in synchronization with the transferring operation of a corresponding stage of the shift registers.

46. A method of driving an active matrix circuit, according to claim 45, wherein the on-off transition of each level shifter is directly controlled by a pulse output from a corresponding stage of the shift registers.

47. A method of driving an active matrix circuit comprising selection lines extending along rows, signal lines extending along columns, and active devices disposed at respective locations where said selection lines and said signal lines cross each other, said method comprising a vertical scanning step for outputting selection pulses to sequentially scan said selection lines thereby selecting active devices, and a horizontal scanning step for outputting control pulses to open or close the respective signal lines thereby inputting or outputting a signal to selected active devices, said horizontal scanning circuit including a first horizontal transfer step for transferring a first start pulse from a first stage to a final stage of a first shift register in a stage-by-stage fashion in response to a first clock signal thereby outputting a control pulse, said vertical scanning step including a second horizontal transfer step for transferring a second start pulse from a first stage to a final stage of a second shift register in a stage-by-stage fashion in response to a second clock signal, wherein said method further comprises a voltage multiplying step for stepping up a low-voltage clock signal input from the outside and supplying a resultant high-voltage clock signal to respective stages of the shift registers, and said voltage multiplying step uses level shifters for individually stepping up a clock signal for respective sets of two or more stages of said shift registers.

48. A method of driving an active matrix circuit, according to claim 47, wherein each said active device uses a thin film transistor including a device region of polysilicon formed on an insulating substrate.

49. A method of driving an active matrix circuit, according to claim 47, wherein each level shifter performs a stepping-up operation in synchronization with the transferring operation of a corresponding set of two or more stages of the shift registers.

50. A method of driving an active matrix circuit comprising selection lines extending along rows, signal lines extending along columns, and active devices disposed at respective locations where said selection lines and said signal lines cross each other, said method comprising a vertical scanning step for outputting selection pulses to sequentially scan said selection lines thereby selecting active devices, and a horizontal scanning step for outputting control pulses to open or close the respective signal lines thereby inputting or outputting a signal to selected active devices, said horizontal scanning step including a transfer step for transferring a start pulse from a first stage to a final stage of a shift register in a stage-by-stage fashion in response to a clock signal thereby outputting a control pulse, wherein said method further comprises a voltage multiplying step for stepping up a low-voltage clock signal input from the outside and supplying a resultant high-voltage clock signal to respective stages of said shift register, said voltage multiplying step using a plurality of level shifters for individually stepping up clock signals for the respective stages of said shift registers, each stage of said shift register performing a transferring operation in response to a clock signal supplied from a corresponding level shifter thereby outputting a control pulse, and said method further comprises a switching step for sampling the clock signal in response to the control pulse and controlling the on/off operation associated with the respective signal lines.

51. A method of driving an active matrix circuit, according to claim 50, wherein each said active device uses a thin film transistor including a device region of polysilicon formed on an insulating substrate.

* * * * *